US012792358B2

(12) United States Patent
Crago et al.

(10) Patent No.: US 12,792,358 B2
(45) Date of Patent: Nov. 10, 2026

(54) HARDWARE AND SOFTWARE SUPPORT FOR PARALLEL PROCESSING PIPELINES

(71) Applicant: NVIDIA Corporation, Santa Clara, CA (US)

(72) Inventors: Neal Clayton Crago, Amherst, MA (US); Stephen William Keckler, Austin, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 200 days.

(21) Appl. No.: 18/651,474

(22) Filed: Apr. 30, 2024

(65) Prior Publication Data

US 2025/0036418 A1 Jan. 30, 2025

Related U.S. Application Data

(60) Provisional application No. 63/529,109, filed on Jul. 26, 2023.

(51) Int. Cl.

*G06F 9/38* (2018.01)
*G06F 8/41* (2018.01)
*G06T 1/20* (2006.01)

(52) U.S. Cl.

CPC .............. *G06F 9/3869* (2013.01); *G06F 8/45* (2013.01); *G06T 1/20* (2013.01)

(58) Field of Classification Search

CPC ............ G06T 1/20; G06F 9/3869; G06F 8/45
USPC .......................................................... 345/505
See application file for complete search history.

(56) References Cited

U.S. PATENT DOCUMENTS

| | | | | |
|---|---|---|---|---|
| 2013/0339681 A1* | 12/2013 | Prado | G06F 9/30123 712/225 |
| 2015/0348224 A1* | 12/2015 | Avkarogullari | G06F 8/47 345/506 |
| 2022/0092725 A1* | 3/2022 | Emberling | G06F 9/30123 |

OTHER PUBLICATIONS

Crago et al., "Hybrid Latency Tolerance for Robust Energy-Efficiency on 1000-Core Data Parallel Processors," IEEE, 2013, 12 pages.
Crago et al., "Outrider: Efficient Memory Latency Tolerance with Decoupled Strands," ISCA: International Symposium on Computer Architecture, 2011, pp. 117-128.
Nguyen et al., "Pipette: Improving Core Utilization on Irregular Applications through Intra-Core Pipeline Parallelism," 53rd Annual IEEE/ACM International Symposium on Microarchitecture (Micro), 2020, pp. 596-608.
Github, "Tiny CUDA Neural Networks," GitHub NVlabs/tiny-cuda-nn, 2024, 7 pages, retrieved from https://github.com/NVlabs/tiny-cuda-nn.

(Continued)

*Primary Examiner* — Thomas J Lett
(74) *Attorney, Agent, or Firm* — Zilka-Kotab, P.C.

(57) ABSTRACT

Technology advancements in computer processors, including in particular graphics processing units (GPUs), have included the introduction of parallel processing capabilities which offer high compute throughput and memory bandwidth. Currently, programmers spend considerable time optimizing their code to best exploit the available parallel processor resources. However, some applications are still unable to consistently attain high compute throughput or memory bandwidth despite the presence of abundant parallelism. The present disclosure provides both hardware and software support for accelerating parallel processing pipelines.

34 Claims, 18 Drawing Sheets

(56) References Cited

OTHER PUBLICATIONS

Bauer et al., "CudaDMA: Optimizing GPU Memory Bandwidth via Warp Specialization," Proceedings of Supercomputing, 2011, 11 pages.
Github, "Cutlass 3.5," GitHub NVIDIA/cutlass, 2024, 11 pages, retrieved from https://github.com/NVIDIA/cutlass.
Bauer et al., "Singe: Leveraging Warp Specialization for High Performance on GPUs," ACM SIGPLAN Symposium on Principles and Practice of Parallel Programming, Feb. 2014, 12 pages.
Burtscher et al., "A Quantitative Study of Irregular Programs on GPUs," IEEE International Symposium on Workload Characterization, Nov. 2012, 10 pages.
Texas A&M University, "AMD/G3_circuit," SuiteSparse Matrix Collection, 2024, 2 pages, retrieved from https://sparse.tamu.edu/AMD/G3_circuit on Jul. 23, 2024.
Texas A&M University, "SNAP/roadNet-CA," SuiteSparse Matrix Collection, 2024, 2 pages, retrieved from https://sparse.tamu.edu/SNAP/roadNet-CA on Jul. 23, 2024.
Texas A&M University, "Williams/mac_econ_fwd500," SuiteSparse Matrix Collection, 2024, 2 pages, retrieved from https://sparse.tamu.edu/Williams/mac_econ_fwd500 on Jul. 23, 2024.
Texas A&M University, "Williams/webbase-1M," SuiteSparse Matrix Collection, 2024, 2 pages, retrieved from https://sparse.tamu.edu/Williams/webbase-1M on Jul. 23, 2024.
Crago et al., "Exposing Memory Access Patterns to Improve Instruction and Memory Efficiency in GPUs," ACM Transactions on Architecture and Code Optimization, vol. 15, No. 4, Oct. 2018, pp. 1-23.
Ham et al., "DeSC: Decoupled Supply-Compute Communication Management for Heterogeneous Architectures," MICRO-48, Dec. 2015, pp. 191-203.
Jamshidi et al., "D2MA: Accelerating Coarse-Grained Data Transfer for GPUs," Proceedings of the 23rd International Conference on Parallel Architectures and Compilation, Aug. 2014, 12 pages.
Kerr et al., "Cutlass: Fast Linear Algebra in CUDA C++," NVIDIA Developer, Blog, Dec. 5, 2017, 15 pages, retrieved from https://developer.nvidia.com/blog/cutlass-linear-algebra-cuda/.
Bitbucket, "hpgmg," Bitbucket, 2017, 6 pages, retrieved from https://bitbucket.org/hpgmg/hpgmg/src/master/.
Lee et al., "Many-Thread Aware Prefetching Mechanisms for GPGPU Applications," Proceedings of the 43rd Annual IEEE/ACM International Symposium on Microarchitecture (Micro), Dec. 2010, pp. 1-12.
Li et al., "Automatic Horizontal Fusion for GPU Kernels," IEEE/ACM International Symposium on Code Generation and Optimization, 2022, pp. 14-27.
Github, "LLNL/LULESH," GitHub, 2024, 2 pages, retrieved from https://github.com/LLNL/LULESH/tree/2.0.2-dev/cuda.
Nguyen et al., "Phloem: Automatic Acceleration of Irregular Applications with Fine-Grain Pipeline Parallelism," Proceedings of the 29th International Symposium on High-Performance Computer Architecture (HPCA), 2023, 13 pages.
NVIDIA, "NVIDIA A100 Tensor Core GPU Architecture," NVIDIA Whitepaper, 2020, pp. 1-82.
NVIDIA, "NVIDIA H100 Tensor Core GPU Architecture," NVIDIA Whitepaper, 2023, 71 pages.
NVIDIA, "CUDA Binary Utilities," NVIDIA Corporation, 2024, 70 pages, retrieved from https://docs.nvidia.com/cuda/cuda-binary-utilities/index.html.
NVIDIA, "CUDA C++ Programming Guide," NVIDIA Corporation, 2024, 627 pages, retrieved from https://docs.nvidia.com/cuda/cuda-c-programming-guide/index.html.
NVIDIA, "cuSPARSE," NVIDIA Developer, 2024, 3 pages, retrieved from https://developer.nvidia.com/cusparse.
NVIDIA, "NVIDIA HPC-Benchmarks," NVIDIA NGC Catalog, 2024, 1 page, retrieved from https://catalog.ngc.nvidia.com/orgs/nvidia/containers/hpc-benchmarks.
Github, "NVlabs/tiny-cuda-nn," GitHub, 7 pages, retrieved from https://github.com/NVlabs/tiny-cuda-nn.
Oh et al., "APRES: Improving Cache Efficiency by Exploiting Load Characteristics on GPUs," ACM/IEEE 43rd Annual International Symposium on Computer Architecture, 2016, pp. 191-203.
Ottoni et al., "Automatic Thread Extraction with Decoupled Software Pipelining," International Symposium on Microarchitecture (MICRO'05), 2005, 12 pages, retrieved from https://liberty.cs.princeton.edu/Publications/micro05_dswp.pdf.
Pellauer et al., "Symphony: Orchestrating Sparse and Dense Tensors with Hierarchical Heterogeneous Processing," ACM Transactions on Computer Systems, vol. 41, Dec. 2023, pp. 1-30.
ECP, "ECP Proxy Apps Suite, Release 6.0," ECP Proxy Apps Suite, Dec. 15, 2022, 5 pages, retrieved from https://proxyapps.exascaleproject.org/ecp-proxy-apps-suite/.
Qi et al., "PointNet++: Deep Hierarchical Feature Learning on Point Sets in a Metric Space," arXiv, 2017, 14 pages, retrieved from https://arxiv.org/pdf/1706.02413.
Radford et al., "Language Models are Unsupervised Multitask Learners," preprint, 2019, 24 pages, retrieved from https://paperswithcode.com/paper/language-models-are-unsupervised-multitask.
Reddi et al., "MLPerf Inference Benchmark," ACM/IEEE 47th Annual International Symposium on Computer Architecture (ISCA), 2020, 15 pages, retrieved from https://arxiv.org/abs/1911.02549.
Rogers et al., "Cache-Conscious Wavefront Scheduling," IEEE/ACM 45th Annual International Symposium on Microarchitecture, 2012, pp. 72-83.
Sankaralingam et al., "Exploiting ILP, TLP, and DLP with the Polymorphous TRIPS Architecture," Proceedings of the 30th Annual International Symposium on Computer Architecture, May 2003, 13 pages, retrieved from https://www.researchgate.net/publication/232652394_Exploiting_ILP_TLP_and_DLP_with_the_polymorphous_trips_architecture.
Sethia et al., "APOGEE: Adaptive Prefetching On GPUs for Energy Efficiency," Proceedings of the 22nd International Conference on Parallel Architectures and Compilation Techniques, 2013, 10 pages, retrieved from https://cccp.eecs.umich.edu/papers/asethia-pact13.pdf.
Sethia et al., "Mascar: Speeding up GPU Warps by Reducing Memory Pitstops," 2015 IEEE 21st International Symposium on High Performance Computer Architecture (HPCA), 2015, 12 pages, retrieved from https://cccp.eecs.umich.edu/papers/asethia-hpca15.pdf.
Smith, J., "Decoupled Access/Execute Computer architectures," ACM SIGARCH Computer Architecture News, vol. 10, Issue 3, Apr. 1, 1982, pp. 112-119.
Thies et al., "Streamlt: A Language for Streaming Applications," International Conference on Compiler Construction, Aug. 2002, 17 pages, retrieved from https://www.microsoft.com/en-us/research/publication/streamit-language-streaming-applications/.
Villa et al., "Need for Speed: Experiences Building a Trustworthy System-Level GPU Simulator," International Symposium on High-Performance Computer Architecture, Feb. 2021, 13 pages, retrieved from https://www.semanticscholar.org/paper/Need-for-Speed%3A-Experiences-Building-a-Trustworthy-Villa-Lustig/dd54c4eee5d603bb35355191db837d21000e39e4.
Wang et al., "Decoupled Affine Computation for SIMT GPUs," ISCA, Jun. 2017, pp. 1-13.
Wang et al., "Stream-based Memory Access Specialization for General Purpose Processors," 46th International Symposium on Computer Architecture (ISCA), Jun. 2019, pp. 736-749.
Yu et al., "IMP: Indirect Memory Prefetcher," MICRO-48, Dec. 2015, 13 pages.
Koo et al., "CTA-Aware Prefetching and Scheduling for GPU," IEEE International Parallel and Distributed Processing Symposium, 2018, pp. 137-148.
Lee et al., "CAWA: Coordinated Warp Scheduling and Cache Prioritization for CriticalWarp Acceleration of GPGPU Workloads," Proceedings of the 42nd Annual International Symposium on Computer Architecture (ISCA '15), Jun. 2015, pp. 515-527.
Maruyama et al., "Optimizing Stencil Computations for NVIDIA Kepler GPUs," First International Workshop on High-Performance Stencil Computations, HiStencils, Jan. 2014, 7 pages.

(56) References Cited

OTHER PUBLICATIONS

Sundaralingam et al., “CuRobo: Parallelized Collision-Free Robot Motion Generation,” IEEE International Conference on Robotics and Automation (ICRA), 2023, pp. 8112-8119.
Topham et al., “Compiling and Optimizing for Decoupled Architectures,” Proceedings of the ACM/IEEE Conference on Supercomputing, 1995, 81 pages.
Tseng et al., “Achieving Out-of-Order Performance with Almost In-Order Complexity,” International Symposium on Computer Architecture, 2008, pp. 3-12.
Wei et al., “Efficient non-fused winograd on gpus,” YouTube presentation from the Advances in Computer Graphics: 37th Computer Graphics International Conference, CGI 2020, 2 pages, retrieved from https://www.youtube.com/watch?v=5Xxstaq6q1w.
Zheng et al., “VersaPipe: A Versatile Programming Framework for Pipelined Computing on GPU,” MICRO-50, Oct. 2017, pp. 587-599.

* cited by examiner

```
int* in; //global memory
int* out; //global memory
...
int start= (…) + threadId.x;
int end = start + warp_transfer_size;
for (int i=start; i<end; i+=WARP_WIDTH)
    out[i] = in[i];
...
```

(a) CUDA Snippet.

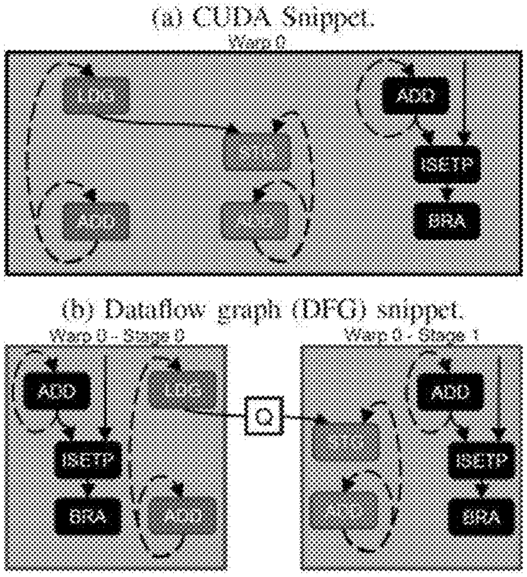

(b) Dataflow graph (DFG) snippet.

(c) WASP DFG transformation.

*Fig. 6A*

```
int* index; //global memory
int* data;  //global memory
int* out;   //global memory
...
int start= (…) + threadId.x;
int end = start + warp_transfer_size;
for (int i=start; i<end; i+=WARP_WIDTH)
    out[i] = data[ index[i] ];
...
```

(a) CUDA Snippet.

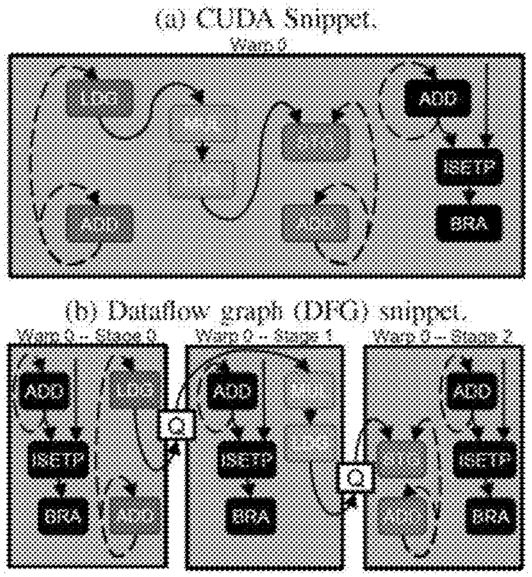

(b) Dataflow graph (DFG) snippet.

(c) WASP DFG transformation.

*Fig. 6B*

```
int* in; //global memory
__shared__ int buffer[];
...
__syncthreads(); //sync buffer ready
int start= (…) + threadId.x;
int end = start + warp_transfer_size;
for (int i=start; i<end; i+=WARP_WIDTH)
    buffer[i] = in[i];
__syncthreads(); //sync transfer done
...
```

(a) CUDA Snippet.

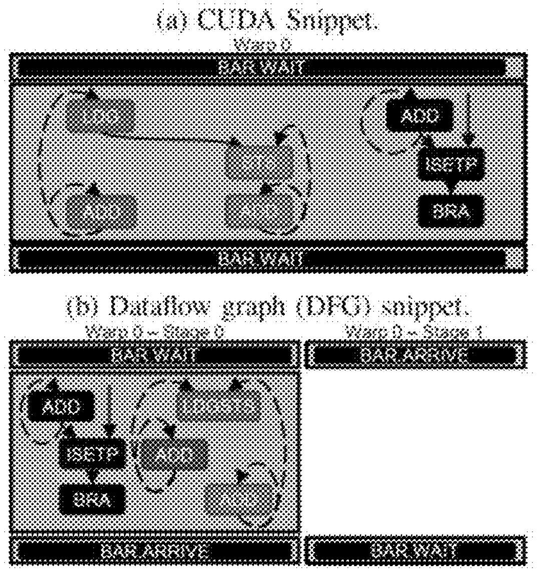

(b) Dataflow graph (DFG) snippet.

(c) WASP DFG transformation.

*Fig. 6C*

(a) Global-SMEM access pattern.

(b) Streaming access pattern.

(c) Gather access pattern.

HARDWARE AND SOFTWARE SUPPORT FOR PARALLEL PROCESSING PIPELINES

CLAIM OF PRIORITY

This application claims the benefit of U.S. Provisional Application No. 63/529,109 titled "HARDWARE SUPPORT FOR WARP SPECIALIZED PIPELINES," filed Jul. 26, 2023, the entire contents of which is incorporated herein by reference.

TECHNICAL FIELD

The present disclosure relates to parallel processing pipelines.

BACKGROUND

Technology advancements in computer processors, including in particular graphics processing units (GPUs), have included the introduction of parallel processing capabilities which offer high compute throughput and memory bandwidth. These parallel processors can support many applications, especially including those with high compute and/or memory bandwidth requirements. For example, widespread use of parallel processors can be found in deep learning, high performance computing, sparse linear algebra, autonomous vehicles, and robotics.

Currently, programmers spend considerable time optimizing their code to best exploit the available parallel processor resources. However, some applications are still unable to consistently attain high compute throughput or memory bandwidth despite the presence of abundant parallelism. One reason that these applications cannot reach peak performance is due to memory latency and bandwidth sensitivity. This sensitivity generally comes from the inability of the kernel to overlap memory accesses with other useful work, causing the resources in the parallel processor to become underutilized.

One way to provide better overlap and reduce memory sensitivity is to refactor the application to exploit pipeline parallelism within a kernel. Today, parallel processors deploy hardware and software libraries to support pipeline parallelism, including for example via the warp specialization technique. Warp specialization specializes a portion of a parallel processor kernel to a particular task, creating pipeline stages that can overlap their execution. This technique is commonly used in libraries supporting fast general matrix multiplication, which typically pipeline coarse-grained global memory to shared memory scratchpad (SMEM) transfers with compute operations (e.g., TensorCore). Despite the broad capability that warp specialization provides, there are still limitations of this start-of-the-art technology including: the lack of compiler support to create warp specialized pipelines, the lack of support for fine-grained memory access patterns which also benefit, and the unexploited opportunity of exposing the structure of the pipeline to GPU hardware.

There is a need for addressing these issues and/or other issues associated with the prior art. For example, there is a need to provide hardware and software support for parallel processing pipelines.

SUMMARY

In embodiments, a method, non-transitory computer readable medium, and system are disclosed to provide software support for a parallel processing pipeline. Code defining a program to be executed using a pipeline having one or more stages is processed, where the processing generates from the code metadata indicating one or more processing contexts, an assignment of each processing context of the one or more processing contexts to a corresponding stage of the one or more stages in the pipeline, and resources to be used for each stage of the one or more stages. The metadata is output to hardware for use in executing the program using the pipeline in accordance with the metadata.

In embodiments, a method and system are disclosed for hardware support for a parallel processing pipeline. Metadata defined for a program to be executed using a pipeline having one or more stages is processed in hardware, where the metadata indicates one or more processing contexts, an assignment of each processing context of the one or more processing contexts to a corresponding stage of the one or more stages in the pipeline, and resources to be used for each stage of the one or more stages, and where the processing includes mapping the one or more processing contexts to one or more processing blocks of a processor core. The one or more processing contexts are executed on the processor core based on the mapping.

BRIEF DESCRIPTION OF THE DRAWINGS

FIGS. 6A-C depict examples of generating pipelines from source code, in accordance with an embodiment.

DETAILED DESCRIPTION

Figure 1:
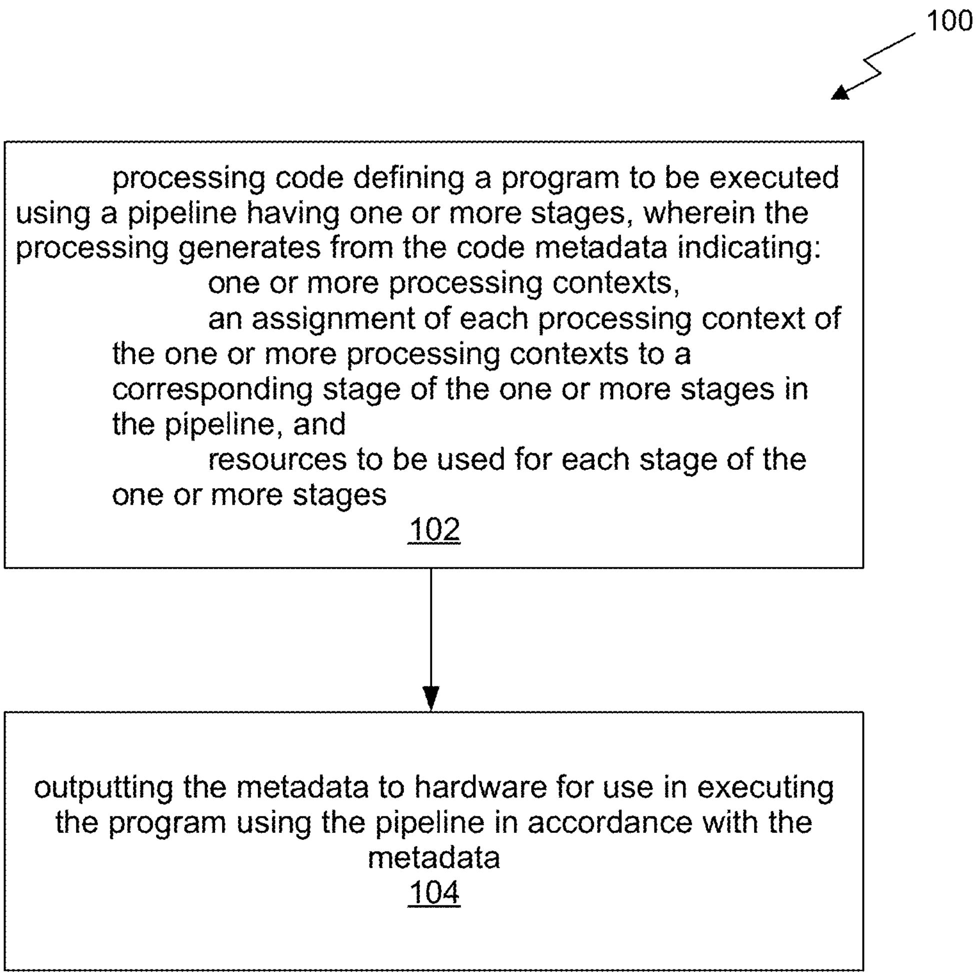
FIG. 1 illustrates a method to provide software support for a parallel processing pipeline, in accordance with an embodiment.

FIG. 1 illustrates a method 100 to provide software support for a parallel processing pipeline, in accordance with an embodiment. The method 100 may be performed by a device, which may be comprised of a processing unit, a program, custom circuitry, or a combination thereof, in an embodiment. In another embodiment, a system comprised of a non-transitory memory storage comprising instructions, and one or more processors in communication with the memory, may execute the instructions to perform the method 100. In another embodiment, a non-transitory computer-readable media may store computer instructions which when executed by one or more processors of a device cause the device to perform the method 100. In one embodiment, the method 100 may be performed by the system 1300 of FIG. 13.

In operation 102, code defining a program to be executed using a pipeline having one or more stages is processed. In the context of the present operation 102 and as described in more detail below, the processing generates from the code metadata indicating one or more processing contexts, an assignment of each processing context of the one or more processing contexts to a corresponding stage of the one or more stages in the pipeline, and resources to be used for each stage of the one or more stages.

The code refers to any computer code that defines (e.g. represents, etc.) an executable program (e.g. application). As mentioned, the program is to be executed using a pipeline having one or more stages. The pipeline refers to a program that is configured to include one or more stages. The stages refer to processing steps. Different instructions may be executed at different processing stages. At least a portion of the stages may be configured to run in parallel and/or at least a portion of the stages may be configured to run serially (e.g. based on defined inter-stage dependencies). In an embodiment, the one or more stages of the pipeline may be heterogenous.

In an embodiment, the pipeline is defined for a processing unit. In an embodiment, the pipeline is defined in a kernel of the processing unit. The processing unit may be a central processing unit (CPU), graphics processing unit (GPU), or any other hardware processor.

In an embodiment, the code may express the pipeline. For example, the pipeline may be indicated in the code. In an embodiment, the code may be an intermediate code generated by processing a source code for the program, wherein the intermediate code expresses the pipeline. In an embodiment, the intermediate code may be generated by a compiler.

As disclosed above, the processing of the code results in the generation of metadata. The metadata indicates, in part, one or more processing contexts. A processing context provides contextual information concerning the processing of the program. In an embodiment, each individual processing context of the one or more processing contexts may include a plurality of threads. The metadata additionally indicates, in part, an assignment of each processing context of the one or more processing contexts to a corresponding stage of the one or more stages in the pipeline. The assignment may be indicated by mapping each of the processing contexts to one of the stages in the pipeline. In an embodiment, two or more of the processing context may be assigned to a same one of the stages in the pipeline.

The metadata further indicates, in part, resources to be used for each stage of the pipeline. In an embodiment, the resources to be used for a stage of the pipeline may include those resources required by the processing context corresponding to (i.e. assigned to) that stage of the pipeline. The resources refer to computing resources. In an embodiment, the resources may include static resources (e.g. storage, functional units, etc.). In another embodiment, the resources may include dynamic resources extrapolated from the static resources. For example, the dynamic resources to be used for a stage of the pipeline may be determined based on all processing contexts corresponding to that stage.

It should be noted that the processing may be performed by an automated process (i.e. without requiring user input). The processing may be performed based upon a configuration of the program and a configuration of the pipeline. In an embodiment, the processing is performed over a plurality of steps. In this embodiment, the plurality of steps may include a first step (e.g. performed by a compiler) in which the code is processed to generate a static program and the metadata with static resources allocated to each stage of the one or more stages of the pipeline. Further to this embodiment, the plurality of steps may include a second step (e.g. performed by a hardware driver) in which the static program is processed to generate a dynamic program and the metadata with dynamic resources determined based on all processing contexts.

In operation 104, the metadata is output to hardware for use in executing the program using the pipeline in accordance with the metadata. In an embodiment, the hardware is the processing unit for which the pipeline has been defined. As mentioned above, the processing unit may be a CPU, GPU, etc.

In any case, the hardware is configured to execute the program using the pipeline in a manner that is based on the metadata. In an embodiment, the metadata may be output to a scheduler configured in the hardware. In this embodiment, the scheduler may be operable to select, based on the metadata, a processor core from a plurality of processor cores to use for execution of the one or more processing contexts. In an embodiment, the hardware may map the one or more processing contexts to one or more processing blocks of a processor core, and then may execute the one or more processing contexts on the processor core streaming multiprocessor based on the mapping. Embodiments of the hardware will be described in more detail below with reference to the subsequent figures.

To this end, the method 100 may be performed to provide software support for the pipeline, which may include parallel stages and may therefore be referred to as a parallel processing pipeline. In an embodiment, the software refers to the code defining the method 100. Whereas in the past pipeline support was only provided via a human generated program transformation, the present method 100 provides an automated process to generate metadata for a program that can then be output to hardware for use in executing the program using the pipeline.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2:
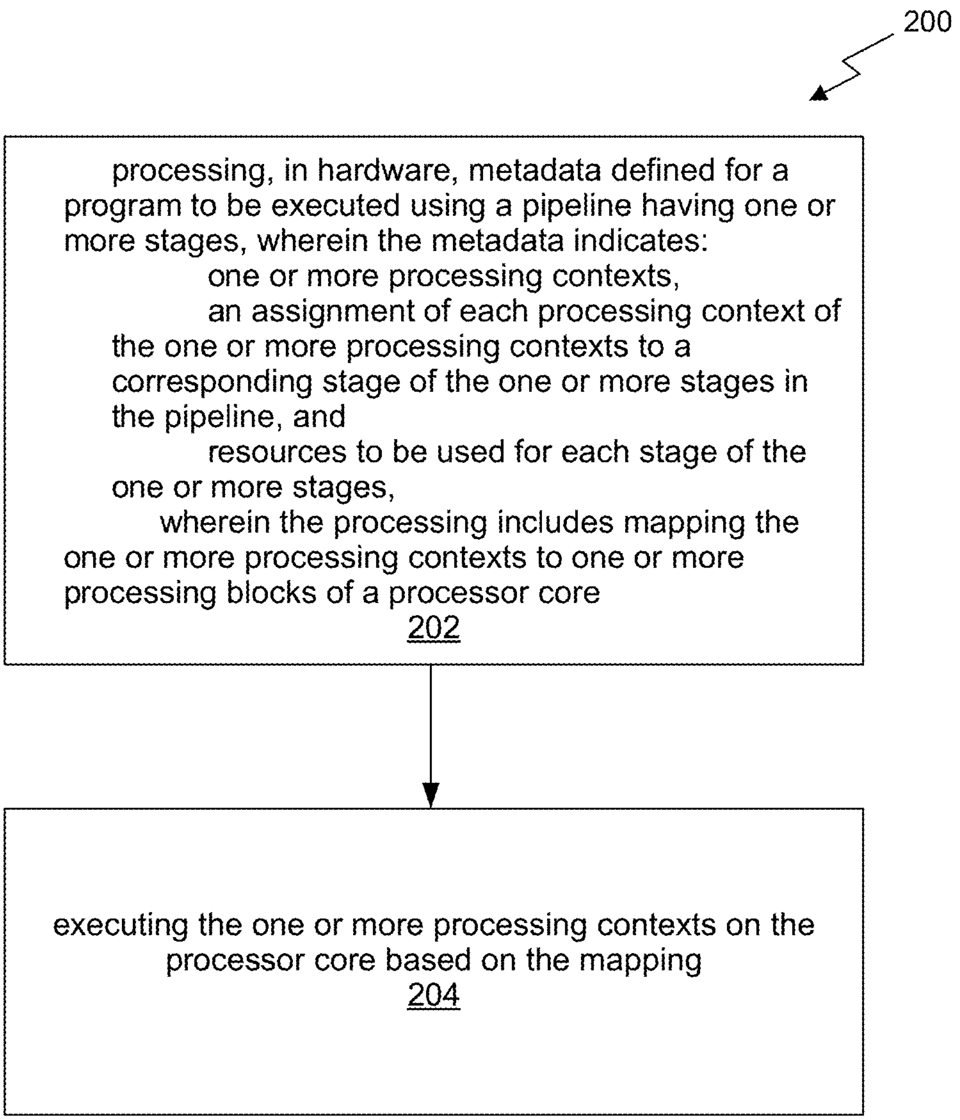
FIG. 2 illustrates a method to provide hardware support for a parallel processing pipeline, in accordance with an embodiment.

FIG. 2 illustrates a method 200 to provide hardware support for a parallel processing pipeline, in accordance with an embodiment. The method 200 may be performed in hardware, such as by a processing unit (e.g. CPU, GPU, etc.), in an embodiment. The method 200 may be performed in the context of the method 100 of FIG. 1, in an embodiment. Accordingly, the definitions and descriptions provided above may equally apply to the present method 200.

In operation 202, metadata defined for a program to be executed using a pipeline having one or more stages is processed. In the context of the present operation 202, the metadata indicates one or more processing contexts, an assignment of each processing context of the one or more processing contexts to a corresponding stage of the one or more stages in the pipeline, and resources to be used for each stage of the one or more stages. To this end, the metadata may be the same as that generated in operation 102 of FIG. 1.

Also in the context of the present operation 202, the processing of the metadata includes mapping the one or more processing contexts to one or more processing blocks of a processor core. In an embodiment, the processing may also include, prior to the mapping, selecting the processor core from among a plurality of processor cores to use for execution of the one or more processing contexts. In an embodiment, the processor core may be selected based on the metadata. For example, the processor core may be selected based on total dynamic resources required for all processing contexts. Such resources may refer to registers and/or scratchpad memory.

Referring back to the mapping of the processing contexts to the processing blocks, such mapping may include sending each processing context of one or more processing contexts to a corresponding processing block of the one or more processing blocks. In an embodiment, the mapping may further include using the metadata indicating the resources to be used for each stage of the one or more stages of the pipeline to allocate space in each processing block of the one or more processing blocks. In an embodiment where the resources include a register, the space may be allocated in a shared register file. In an embodiment, the mapping may map all processing contexts belonging to a same pipeline slice together on a same processing block.

In a further embodiment, processing the metadata may also include setting a program state for execution. In an embodiment, the program state may include a queue status. The queue status may be a register file queue status, which may include (i.e. may take the value of) empty, full, and/or current number of elements stored. In another embodiment, the program state may include a pipeline stage status. The pipeline stage status may be (i.e. may take the value of) a number of instructions executed. In other embodiments, the program state may include a memory buffer status and/or a pipeline stage identifier. Of course, it should be noted that the program state may include any combination of the aforementioned parameters and/or any other parameters as desired.

In operation 204, the one or more processing contexts are executed on the processor core based on the mapping. In an embodiment, each of the processing blocks may execute the processing context that is mapped thereto. During execution, the program state may be updated to reflect a current program (execution) status.

In an embodiment, the one or more processing contexts may be executed on the processor core based on a prioritization policy. In an embodiment, the prioritization policy may use the pipeline stage identifier included in the program state to determine a next processing context to execute based on a current stage of the pipeline. In another embodiment, the prioritization policy may use the queue status (e.g. the register file queue status) included in the program state to determine a next processing context to execute.

To this end, the method 200 may be performed to provide hardware support for the pipeline, which may include parallel stages and may therefore be referred to as the parallel processing pipeline. In an embodiment, the hardware refers to the hardware performing the method 200. The hardware uses the metadata defined for a program to determine processing context-to-processing block mapping which can then be used as the basis for executing the processing contexts.

Figure 3:
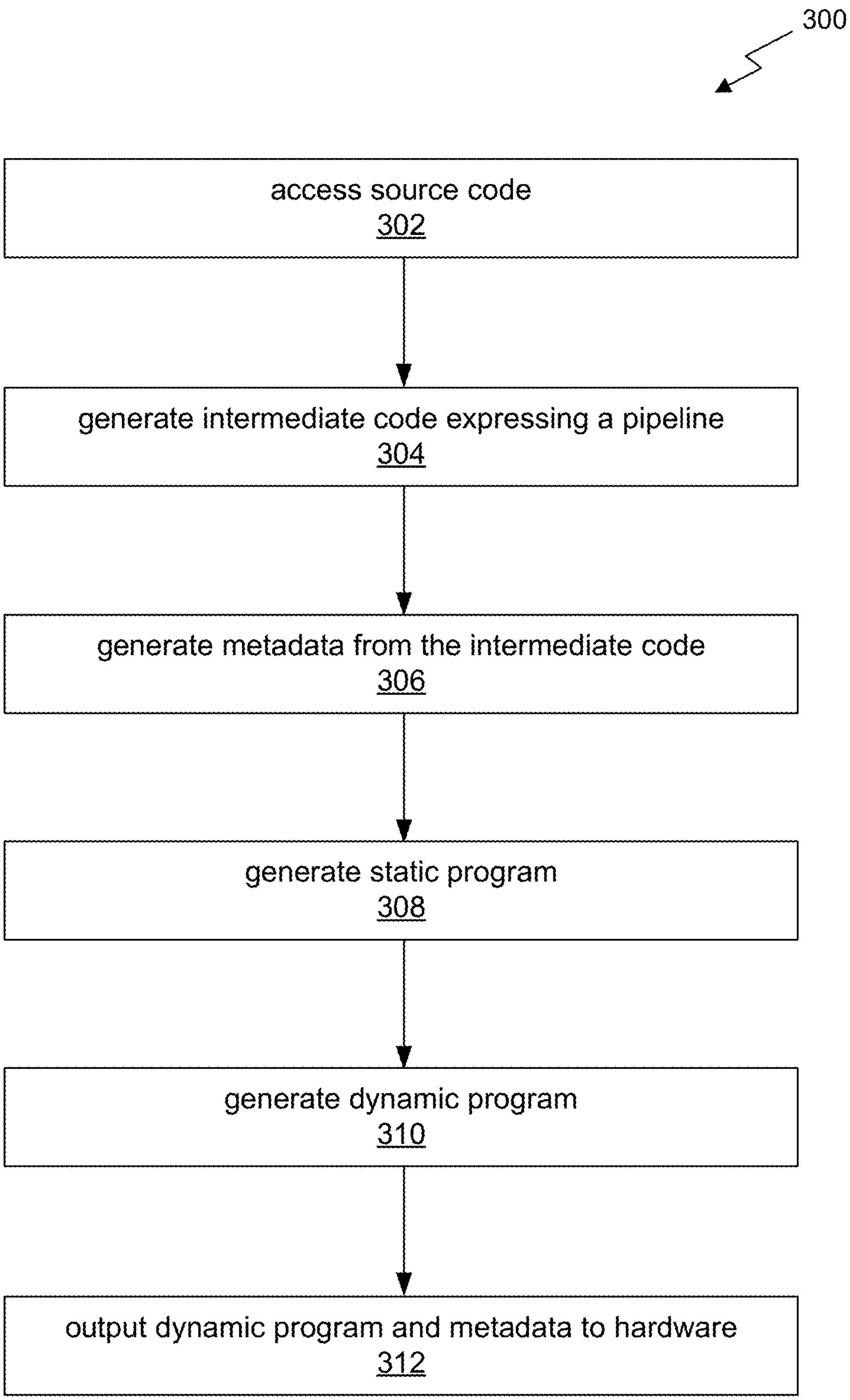
FIG. 3 illustrates a method in which software support for a parallel processing pipeline is provided, in accordance with an embodiment.

FIG. 3 illustrates a method 300 in which software support for a parallel processing pipeline is provided, in accordance with an embodiment. The method 300 may be performed in accordance with the embodiment of FIG. 1, for example. In an embodiment, the method 300 may be performed by a combination of a compiler and hardware.

In operation 302, a source code is accessed. The source code refers to developer-generated code that defines a program. The source code may be accessed by the compiler.

In operation 304, intermediate code is generated which expresses a pipeline. The intermediate code may be generated by processing the source code for the program, in an embodiment. In an embodiment, the intermediate code may be generated to express the pipeline, or in other words, the pipeline may be created for the source code. The intermediate code may be generated by the compiler.

In operation 306, metadata is generated from the intermediate code. In the present embodiment, the metadata indicates at least: one or more processing contexts, an assignment of each processing context of the one or more processing contexts to a corresponding stage of the one or more stages in the pipeline, and resources to be used for each stage of the one or more stages. The metadata may be generated automatically by the compiler.

In operation 308, a static program is generated. In particular, the static program is generated from the intermediate code and the metadata. In an embodiment, the static program allocates static resources to each stage of the one or more stages of the pipeline. The static program may be generated by the compiler.

In operation 310, a dynamic program is generated. In particular, the dynamic program is generated from the static program and the metadata. In an embodiment, the dynamic program determines dynamic resources based on all processing contexts. The dynamic program may be generated by hardware (e.g. a hardware driver).

In operation 312, the dynamic program and the metadata are output to hardware. The hardware may use the dynamic program for executing the program using the pipeline in accordance with the metadata. In an embodiment, the dynamic program and the metadata may be output to a scheduler configured in the hardware, which selects, based on the metadata, a processor core from a plurality of processor cores to use for execution of the one or more processing contexts.

Exemplary Implementation

Compiler-Pipeline Stage Extraction

Similar to past work, the partitioning process focuses on overlapping long-latency memory accesses with compute by breaking the original program into pipeline stages using global memory load-use boundaries. First, a program dependence graph (PDG) of the original program is constructed. The PDG maintains control flow edges and data dependencies between instructions of the program. Next, the PDG is partitioned into processing context pipeline stages using a pipeline stage extraction scheme. All global memory load instructions (LDG) within the kernel are identified and it is determined which are eligible for pipeline stage extraction using the instruction's backslice. The backslice includes all instructions in the original program that the LDG directly depends on and the instructions contributing to program control flow that the LDG indirectly depends on. A backslice containing SMEM load instructions (LDS) instructions indicates that the LDG may have memory dependencies to SMEM store (STS) instructions that cannot be tracked and is therefore not eligible for pipeline stage extraction. Similarly, a backslice containing a dependency cycle of the LDG with itself is also excluded.

Each eligible LDG instruction is split into two new instructions at the load-use boundary: LDG_PRODUCER for the address, and LDG_CONSUMER for the result of the load. As a special case, LDG instructions that are only connected to SMEM stores are identified and combined into a single load-global-store-shared (LDGSTS) instruction. These LDGSTS instructions require specific synchronization as described later.

Figure 4:
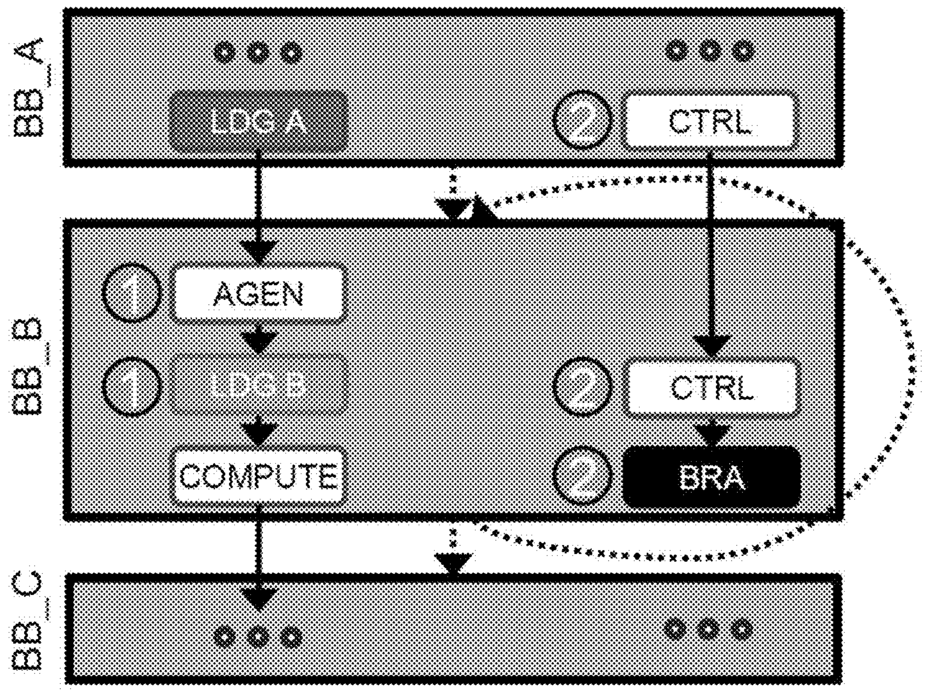
FIG. 4 illustrates a two-phase pipeline stage extraction from code, in accordance with an embodiment.

In the first extraction phase, an initial new stage is created for each LDG_PRODUCER and LDGSTS using a collection of required instructions and basic blocks. The backslice of address generation instructions for each LDG_PRODUCER and LDGSTS is identified and added to the collection by traversing the PDG. The backslice depth-first search terminates at either dependence chain endpoints or upstream LDG_PRODUCER instructions. FIG. 4 depicts that the address generation backslice for LDG B terminates at LDG A and contains two instructions (1).

The second extraction phase completes the new stage's PDG subgraph by adding the minimum basic blocks and associated control flow instructions. For each instruction in the stage's collection, the parent basic blocks that flow into the instruction's assigned basic block are added to a search list. For each unvisited basic block in the list, the block is marked visited and checked to see if it contains a branch instruction. If there is a branch, a backslice of instruction for the branch is generated and added to the collection. The search process continues until all instructions in the collection have been examined, signaling the collection represents all the instructions required for executing the stage. A PDG subgraph is generated using the instructions, keeping them in the original program order. FIG. 4 shows that the address generation instructions in (1) are assigned to basic block B (BB_B) and parents BB_A and BB_B are added to the search list. BB_A has no branch, while BB_B has a branch to backslice. The instructions in (2) are added to the stage's collection, and the process continues. Basic blocks BB_A and BB_B have already been visited, so the second extraction phase completes.

An optimization pass is performed at the end of the second phase to detect if the LDG or LDGSTS instruction is contained in a loop that can be offloaded to the present Tensor Memory Accelerator (TMA). If the loop and address generation pattern is suitable, the identified control flow and address generation instructions within the loop are replaced with a TMA configuration instruction.

Pipeline Finalization and Configuration

When all eligible LDG_PRODUCER instructions have been processed and all stages extracted, a final program representing the pipeline is generated. First, there is a set of original program instructions that remain unallocated. This set of instructions represents the compute belonging to the final pipeline stage, including all shared memory and global store instructions. These instructions are allocated to a new stage, and remain in program order. Next, stages are optionally merged depending on whether the number of stages extracted can be supported on the processor core. To reduce a large number of extracted stages, memory access stages can be merged with similar level of memory indirection.

After this (optional) merge step is complete, the stages are given explicit pipeline stage names based on their natural order. For a pipeline of size N, stage zero is the earliest stage and stage N−1 is the last stage. The program specification is then updated with the number of pipeline stages. Table 1 described below depicts the program specification table that is populated during this final process.

The communication and synchronization between stages are also finalized. Stages with LDG and LDGSTS instructions are handled differently. For LDG_PRODUCER and corresponding LDG_CONSUMER instructions the RFQ is used, and a new named queue connecting the two stages is added to the thread block specification with a fixed size. The LDG_PRODUCER and corresponding LDG_CONSUMER instructions are updated to use the named queue, and the LDG_CONSUMER instruction is optionally merged into the dependent instruction if there is only a single dependent instruction.

Stages with LDGSTS instructions must synchronize with the compute pipeline stage to ensure correct behavior. This implies inserting coordinated arrive/wait barriers. The compiler automates the process for both single and double buffering. For both cases, a pair of BAR.SYNC barrier instructions that enclose the LDGSTS are first identified by inspecting the PDG. For single buffering, each BAR.SYNC instructions is replaced with an arrive/wait barriers at the same program location in the two processing contexts using BAR.WAIT and BAR.ARRIVE instructions.

Figure 5:
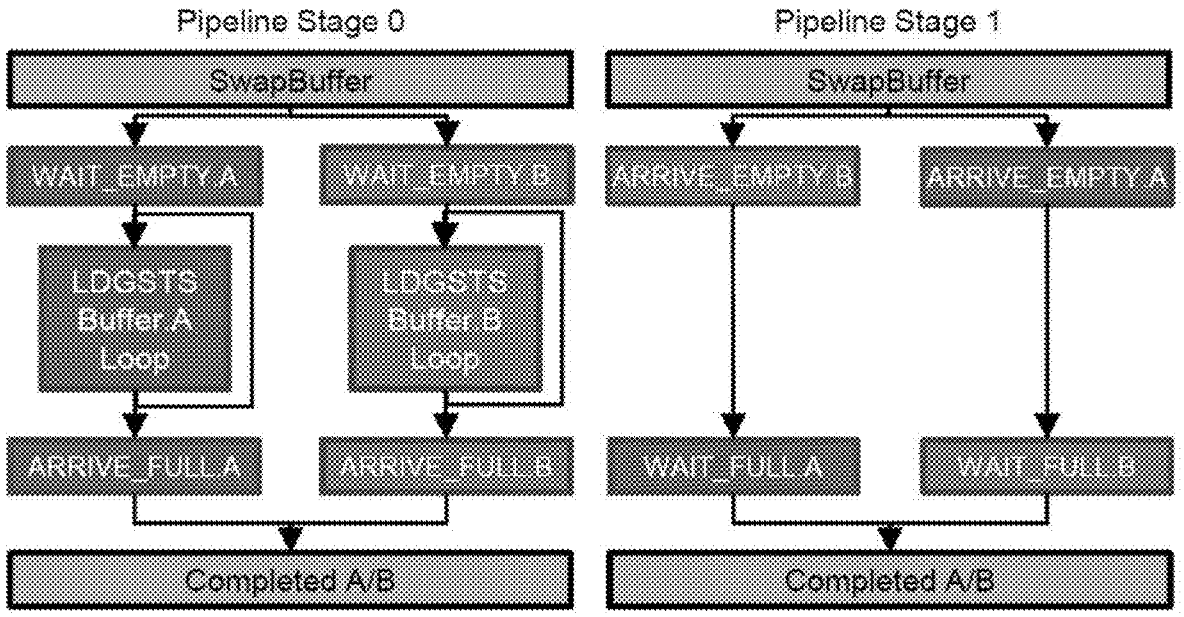
FIG. 5 illustrates pipeline stage SMEM double buffering, in accordance with an embodiment.

Double buffering is more complex and requires doubling the SMEM buffer and arrive/wait barriers. The address backslice of the LDGSTS instruction and the SMEM allocation information are used to identify which shared buffer is used. A check is performed to determine if there is SMEM capacity available for double buffering, before resizing and applying the transformation. FIG. 5 presents how the program uses this larger buffer. The subprogram for the global-to-SMEM transfer between the two enclosing barriers is replicated to create two new subprograms accessing different halves of the SMEM buffer, with each using unique sets of arrive/wait barriers (A and B in FIG. 5). New basic blocks (swap_buffer, completed) are added before and after the subprograms with instructions that switch execution between the two buffers by alternating the base address. For the later pipeline stage (Stage 1 in FIG. 5), barrier A is initially set as arrived.

Finally, the programs for the pipeline stages are combined to create a complete program. First register re-allocation is performed; the compiler performs a simple reallocation by compacting the registers into contiguous space. The program specification is updated to assign register allocation sizes per stage (Table 1 below). The pipeline stages are then written sequentially to a final program. A jump table is added to the top of the program to direct each processing context to the appropriate code section, using the special register for explicit naming.

Explicit Processing Context to Pipeline Stage Naming

The method 300 provides for the assignment of processing contexts to pipeline stages in hardware, while allowing a programmer or compiler to specify the configuration of the pipeline. At the core, each processing context is assigned a pipeline stage id. As described above with reference to FIG. 2 and below with reference to at least FIGS. 4-5, this explicit naming allows the hardware to be pipeline-aware and make better mapping, register allocation, scheduling, and data movement decisions.

To implement explicit naming, an existing program specification is extended by adding an additional dimension representing the depth of the pipeline. Table 1 presents this specification with the new dimension "Number of Pipeline Stages" as well as other metadata generated by the compiler.

TABLE 1

| Specification | Set by | Description |
|---|---|---|
| Processing context dimensions | Programmer | {x, y, z} |
| Number of Pipeline Stages | Compiler | Default = 1 |
| Pipeline Stage Registers | Compiler | Per-stage |
| Named Queues | Compiler | {src id, dst id, size} |
| SMEM usage | Programmer | Original program |

The new dimension is explicitly declared at kernel invocation time by the programmer or code generation framework. In an embodiment, the new processing context dimension specification is in the form: {dim.x, dim.y, dim.z, num pipeline stages}.

When executing on the processor core, a thread is assigned a pipe_stageld. This new hardware state is found in the special registers in the processor core and can be queried by the threads to determine its assigned pipeline stage, similar to querying other parameters such threadId.x.

Memory Access Pattern Examples

FIGS. 6A-C depict examples of generating pipelines for the streaming global-to-RFQ, gather global-to-RFQ, and global-to-SMEM patterns. Each of examples focuses on the inner loop of a kernel, and depicts an instruction-level dataflow graph for the basic block of that inner loop.

FIG. 6A shows a streaming global-to-RFQ example for copying an input vector to an output vector. In the inner loop, the processing contexts execute a global load instruction (LDG) that forwards data into a global store instruction (STG). Both the LDG and STG instructions have their own address generation instructions (ADD), and the inner loop has instructions that manage the control flow (black). Considering the single LDG instruction in the inner loop, the kernel consists of two pipeline stages (processing_context0 stage0 and processing_context0 stage1). The backwards slice of instructions contributing to the LDG address are allocated to the earlier pipeline stage, and the remaining instructions to the later pipeline stage. The control flow instructions for the basic block are replicated across both processing contexts, to maintain coherent execution between the two stages. Finally, the LDG destination operand is connected to the STG source operand using the QS0S1 named queue.

FIG. 6B shows how a gather global-to-RFQ operation leads to an additional pipeline stage. The source code inner loop reads from global memory array index and uses the result as an index into the data array. This indirection manifests in the DFG as an additional LDG and address generation. Similar to the prior global-to-RFQ example, both LDG instructions of the original inner loop are used as the point of partitioning. Three total stages are generated, with replicated control flow instructions queues used to connect the pipeline stages together.

FIG. 6C shows how code is generated for global-to-SMEM memory tile transfers using single buffering. In the original source program, shared memory is allocated for the buffer array that is shared among all threads in the program. The_syncthreads ( ) function is used to synchronize on the state of buffer before and after the transfer. The dataflow graph looks otherwise similar to the streaming copy example, with the only exception a SMEM store instruction (STS) replacing the STG. First, the LDG and STS instructions are fused into a single LDGSTS instruction, and the appropriate address generation and control flow instructions are allocated to the earlier pipeline stage processing_context0 stage0. The processing_context0 stage 1 is empty of instructions in the inner processing_context as there is no compute. Finally, the BAR.WAIT and BAR.ARRIVE instructions are inserted to synchronize the threads.

Figure 7:
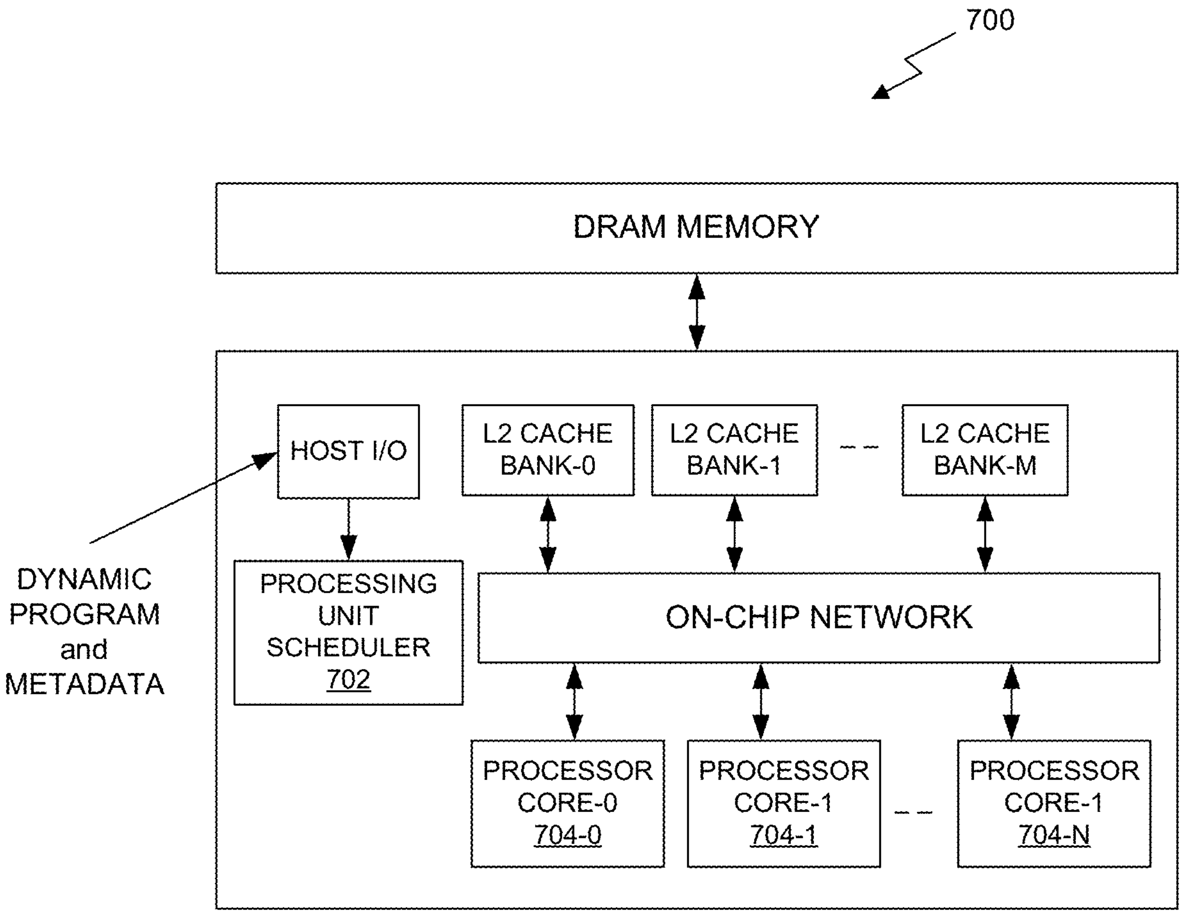
FIG. 7 illustrates a configuration of hardware that supports a parallel processing pipeline, in accordance with an embodiment.

FIG. 7 illustrates a configuration of hardware 700 that supports a parallel processing pipeline, in accordance with an embodiment. The hardware 700 may be implemented in the context of the embodiment of FIG. 2, for example. The hardware 700 may operate using the output of the method 300 of FIG. 3, in an embodiment. The hardware may refer to a processing unit having multiple processor cores 704-1 to 704-N.

As shown, a scheduler 702 configured in the hardware 700 accesses a dynamic program and corresponding metadata. The dynamic program and corresponding metadata may be generated in accordance with the method 300 of FIG. 3. In any case, in the context of the present description, the metadata indicates one or more processing contexts, an assignment of each processing context of the one or more processing contexts to a corresponding stage of the one or more stages in the pipeline, and resources to be used for each stage of the one or more stages.

The scheduler 702 processes the metadata. In particular, the scheduler 702 selects a processor core 704-N from among the processor cores 704-0 to 704-N to use for execution of the one or more processing contexts. In an embodiment, the processor core 704-N may be selected based on the metadata. For example, the processor core 704-N may be selected based on total dynamic resources (e.g. registers and/or scratchpad memory) required for all processing contexts. The scheduler 702 provides the dynamic program and the metadata to the processor core 704-N.

Figure 8:
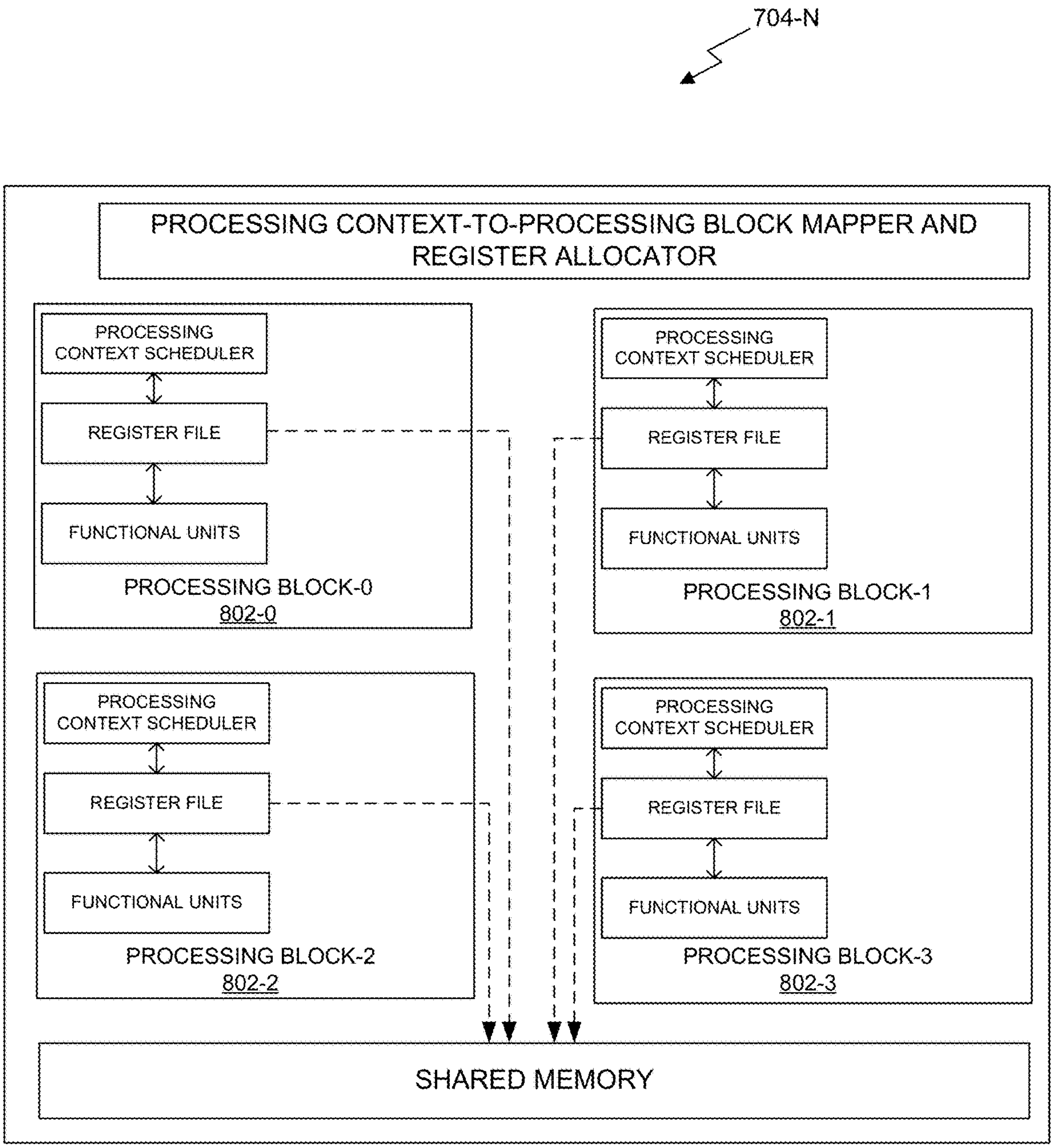
FIG. 8 illustrates a configuration of the processor core of FIG. 4, in accordance with an embodiment.

FIG. 8 illustrates a configuration of a processor core 704-0 to 704-N of FIG. 7, in accordance with an embodiment. In particular, FIG. 8 illustrates the processor core 704-N selected by the processing unit scheduler 702 for use in executing the one or more processing contexts.

The processor core 704-N includes a plurality of processing blocks 801-0 to 801-3. While only four processing blocks 801-0 to 801-3 are shown, it should be noted that the processor core 704-N may be configured to include any number of processing blocks.

The processor core 704-N maps the one or more processing contexts to one or more of its processing blocks based on the metadata. The processor core 704-N also allocates space in each of its processing blocks for the execution of the processing contexts. In an embodiment, a program state is set for execution.

Each processing context is then sent to its assigned processing block for execution. Each processing block 801-0 to 801-3 includes its own scheduler which manages the execution on the processing block of the processing contexts assigned thereto. In an embodiment, the processing block 801-0 to 801-3 scheduler uses the program state to decide which processing context to execute.

Exemplary Implementation

Pipeline Aware Processing Context Mapping and Register Allocation

When a program is scheduled to execute on a processor core, each processing context must be mapped (i.e., assigned) to execute on a processing block. The processing context-to-processing block mapping is controlled by a hardware mapper within the processor core that first receives a program specification from a global processing unit scheduler, then distributes the processing contexts among the processing blocks for execution. The distribution may be done in a round-robin manner. The mapper leverages the new information in the specification to improve both the processing context-to-processing block mapping algorithm and register allocation.

Figure 9:
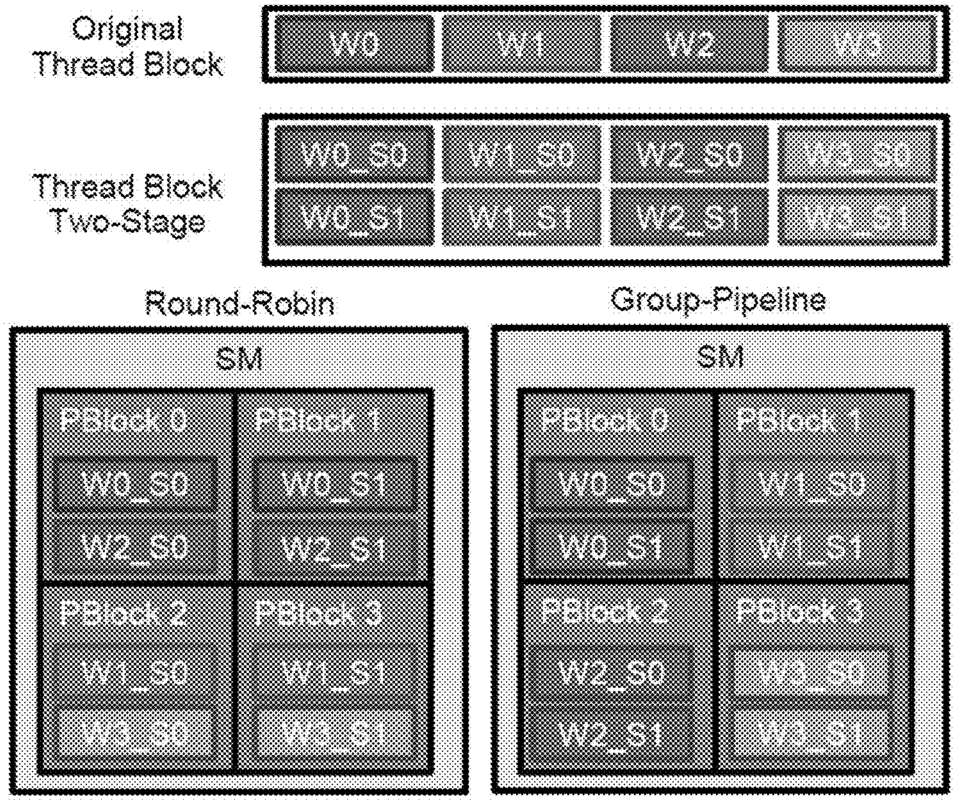
FIG. 9 illustrates two possible processing context-to-processing block mapping algorithms, in accordance with an embodiment.

In an embodiment, the mapping algorithm focuses on balancing computation resource usage by minimizing the mapping of similar pipeline stages to the same processing block. In an embodiment, the mapping algorithm maps all processing contexts belonging to the same pipeline slice together on the same processing block. FIG. 9 demonstrates the potential value of the presently disclosed mapping algorithm over a round-robin mapping algorithm, where a two-stage pipeline has four processing contexts per stage. In one example of this two-stage pipeline, S0 is a memory access stage and S1 is a compute stage. The round-robin algorithm maps processing contexts one at a time alternating across the processing blocks, leading to imbalanced execution with S0 stages mapped to processing blocks 0 and 2, and S1 stages mapped to processing blocks 1 and 3. The mapping algorithm that maps all processing contexts belonging to the same pipeline slice together on the same processing block provides better balance by executing the processing context of each pipeline slice on the same processing block.

During the mapping process, register allocation for the processing context is performed by carving out a contiguous segment of the processing block's shared register file. In parallel processing pipelines, different pipeline stages run different programs and therefore use a different number of registers. However, in current processing units, parallel processing pipelines are allocated a uniform value for processing context register allocation which is the maximum usage among all pipeline stages. Some pipeline stages may require nearly the same number of registers per thread as the original program, which can result in a nearly N times increase in program register usage for an N-stage pipeline. In an embodiment, the per-pipeline-stage register values from the program specification in Table 1 may be used to allocate uniquely-sized register segments, which saves considerable register file space.

Register File Queues

Figure 10:
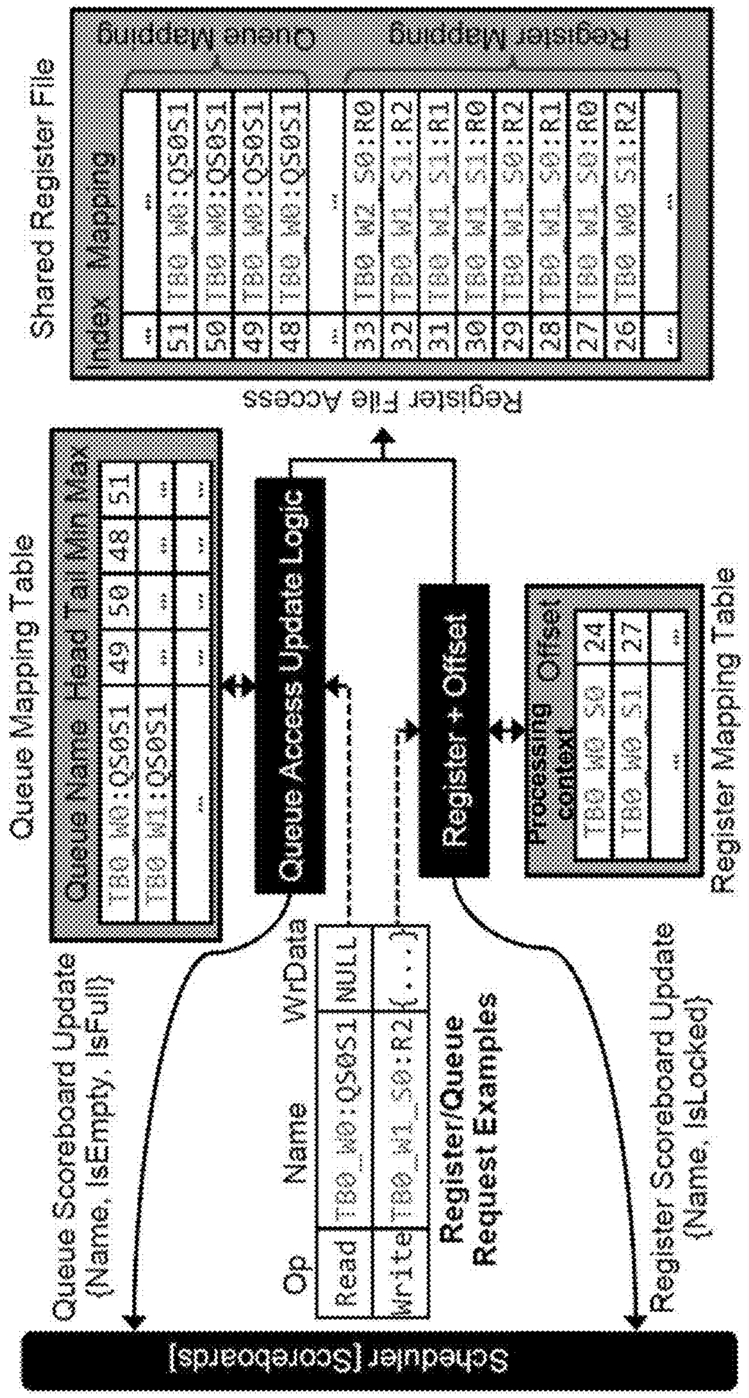
FIG. 10 illustrates register file queues (RFQs) of a processor core processing block, in accordance with an embodiment.

While current hardware for parallel processing pipelines supports coarse-grained memory tile data movement between global memory and SMEM, some memory-sensitive applications heavily utilize use-once data. This use case manifests as fine-grained streaming and gather memory access patterns, which parallel processing pipelines support by using a queue between pipeline stages. In an embodiment, hardware queues may be implemented by mapping them as circular buffers in the existing register file space. FIG. 10 depicts how register file queues (RFQs) integrate into the processor core processing block.

Similar to per-processing context register allocation, named queues connecting pipeline stages are explicitly defined in the program specification and allocated in the physical register file at processing context mapping time. For example, T B0_W0_S0S1 specifies that program 0 has a named queue connecting stages 0 and 1 of original processing context 0. Each named queue is supported by an accompanying hardware table to maintain the state of the queue, which includes the head pointer, tail pointer, queue allocation start index, and queue allocation end index.

The processing unit's instruction set architecture (ISA) may be extended to use these names directly as processing context instruction operands, similar to registers. For example, when T B0_W0_S0 executes the processing context instruction LDG Q1, [RX], then a decoupled load to global memory is issued, sending data to T B0_W0_S1 using the T B0_W0_QS0S1 queue. Similarly, T B0_W0_S1 can execute the processing context instruction to read the data from the T B0_W0_S1 queue: MOV RY,Q0.

An RFQ scoreboard sitting at the processing context instruction scheduler supports whether there is either data in the queue (i.e. on a read) or if there is room in the queue for more data (i.e. a write). These scoreboard bits is_empty, is_full are updated on successful reads or writes to an RFQ.

Pipeline Aware Processing Context Scheduling in the Processor Core

The hardware processing context scheduler within the processing blocks may also be augmented with a new pipeline-aware prioritization policy that promotes execution overlap. In an embodiment, the hardware processing context scheduler stores information about the state of each processing context (e.g. waiting on long/short scoreboard) which is used to determine its scheduling priority. To augment this, each hardware processing context scheduler also stores the pipeline stage id and incoming data queue status (e.g. queue is not empty, queue is full) for each processing context, which act as additional inputs to the scheduling decision making algorithm. Using these new inputs, processing context scheduling policies that leverage the pipeline stage meta-information for prioritization may be implemented.

One possible policy uses the pipeline stage id input to prioritize a processing context based on which stage it is in the pipeline. In an embodiment, the naming convention defines pipe_stageId_0 as the first stage in the pipeline, and pipe_stageld_N−1 as the final stage in a N-stage pipeline. Given a set of processing contexts executing on a processor core processing block, earlier stages may be prioritized by increasing order of the value of their pipe_stageld. Prioritizing earlier stages of the pipeline may be desired since these stages tend to be memory access stages with long memory latencies it is beneficial to overlap.

Another possible policy builds upon the first policy mentioned above and uses the RFQ status input to prioritize which processing context to schedule. For each processing context, the following bits are kept: is_empty, is_full. The hardware processing context scheduler uses the is_empty, is_full RFQ status bits to prioritize consumer processing contexts when data is ready. These two policies may therefore be combined in the hardware processing context scheduler. In an embodiment, the prioritization may be provided as follows: prioritizing processing contexts with full queues, followed by processing contexts with ready buffers or non-empty queues, followed by earlier stages of the pipeline.

Accelerating Address Generation

Figure 11:
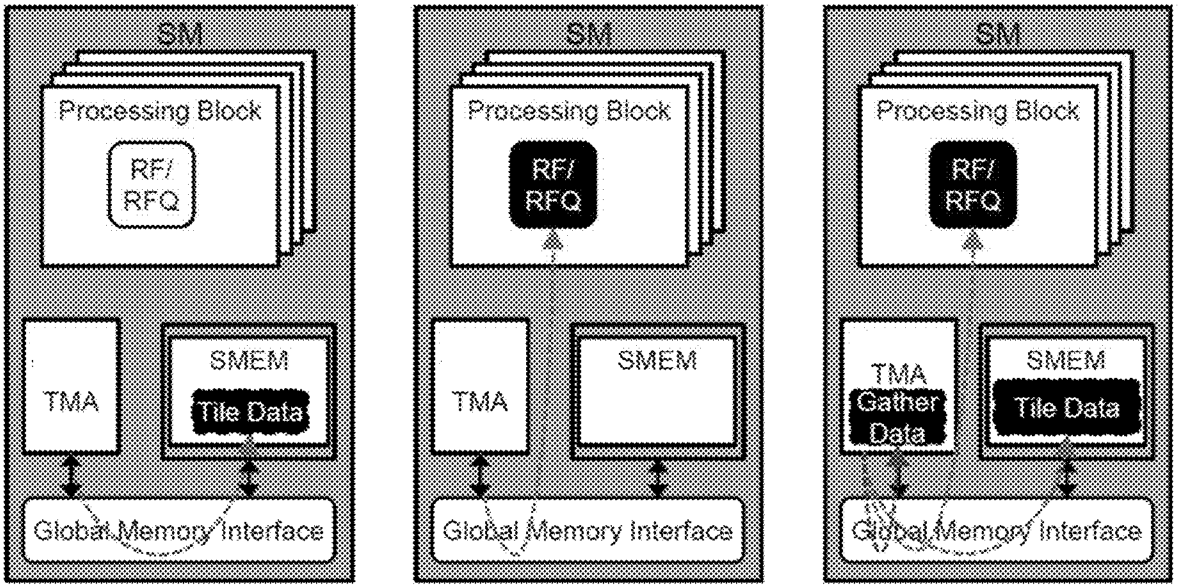
FIG. 11 illustrates accelerator data movement patterns for a processor core, in accordance with an embodiment.

Tensor Memory Accelerator (TMA) is an offload accelerator for coarse-grained memory tile transfers between global memory and SMEM. TMA uses new instructions to specify the global memory block to transfer, using meta information such as base address, stride, offset, and the dimensions. Offloading memory access instruction streams to TMA reduces processing context instruction issue slots and registers and allows more resources in the processor core processing block for computation, such as TensorCore operations. Offloading memory access instruction streams to TMA further accesses more efficiently, reducing energy consumption. In an embodiment, TMA may be augmented with the ability to handle fine-grained memory accesses at the thread granularity. FIG. 11 presents the patterns that are supported, which includes memory tile transfers between global memory and SMEM (a), streaming data between global memory and RFQs (b), and gather operations between global memory and SMEM/RFQ (c).

A TMA-like global-SMEM instruction is used to move coarse-grained data between global and SMEM, using arrive-wait barriers for synchronization. A new global-RFQ configuration is added to target a named RFQ instead of SMEM. Fine-grained synchronization is accomplished using the status table for the RFQ. Typical decoupled LDG instructions writing a register file queue acquire a single entry in the queue. However, the present TMA global-RFQ instructions acquire multiple entries, delaying issue until they are available.

The gather access pattern (C [i]=B [A [i]]) focuses on minimizing data movement and effectively fuses two operations together. The present TMA (gather-SMEM) and (gather-RFQ) instructions first generate a gather memory access stream to an array of indices in global memory. As the gather indices arrive at global memory, they are consumed by the present TMA and processed in a second phase. The second phase combines the gather indices with a base address to generate a memory request stream that either targets SMEM (gather-SMEM) or the RFQ (gather-RFQ). Incoming indices are held in a ping pong buffer with two entries, one for the set of indices currently being processed by TMA and another entry for receiving a new set of indices in the same cycle. By not writing the gather indices back to SMEM, the present TMA eliminates extra RFQ and SMEM traffic that would otherwise be required.

Parallel Processing Architecture

Figure 12:
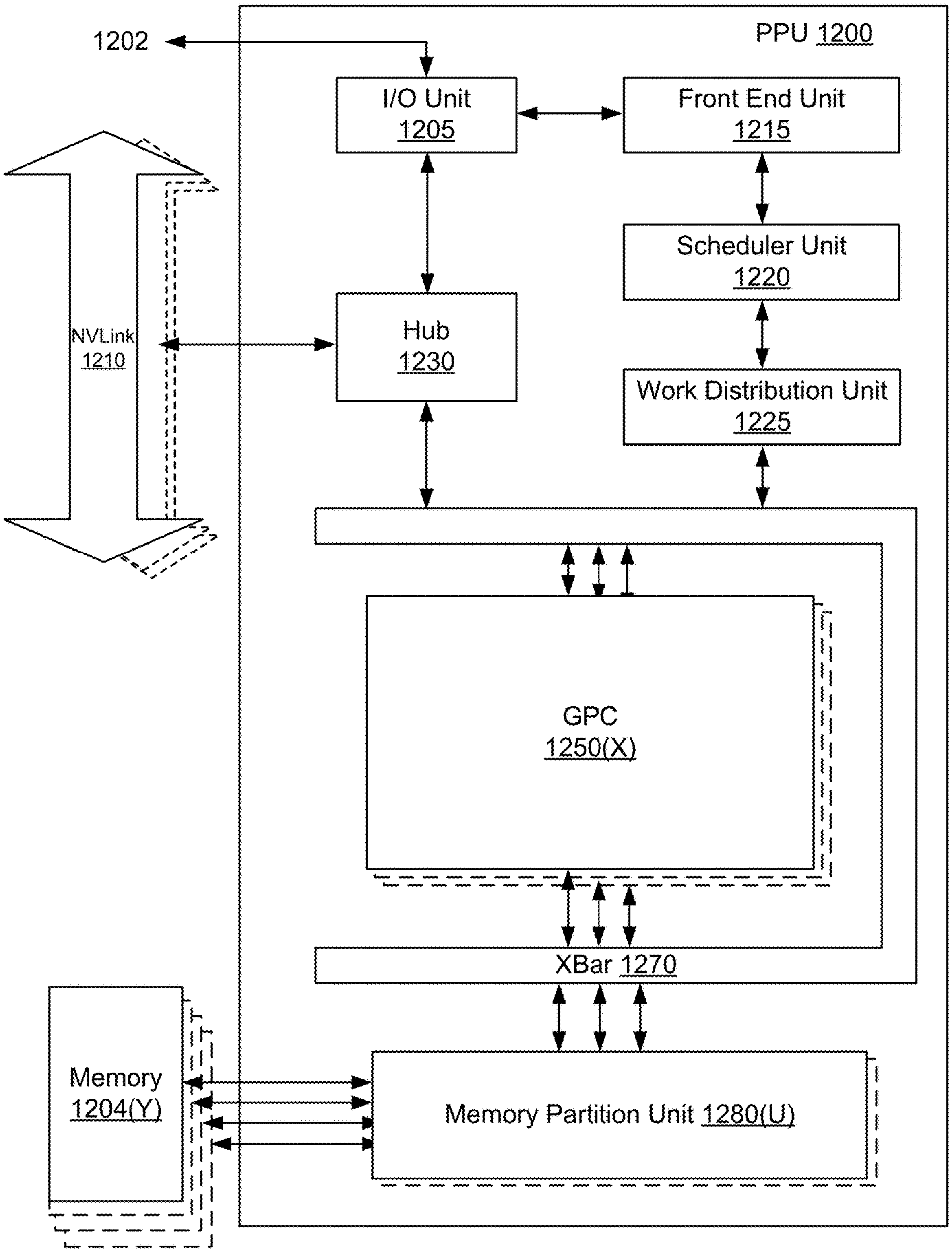
FIG. 12 illustrates a parallel processing unit, in accordance with an embodiment.

FIG. 12 illustrates a parallel processing unit (PPU) 1200, in accordance with an embodiment. In an embodiment, the PPU 1200 is a multi-threaded processor that is implemented on one or more integrated circuit devices. The PPU 1200 is a latency hiding architecture designed to process many threads in parallel. A thread (e.g., a thread of execution) is an instantiation of a set of instructions configured to be executed by the PPU 1200. In an embodiment, the PPU 1200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 1200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 1200 may be configured to accelerate thousands of High Performance Computing (HPC), data center, and machine learning applications. The PPU 1200 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 12, the PPU 1200 includes an Input/Output (I/O) unit 1205, a front end unit 1215, a scheduler unit 1220, a work distribution unit 1225, a hub 1230, a crossbar (Xbar) 1270, one or more general processing clusters (GPCs) 1250, and one or more memory partition units 1280. The PPU 1200 may be connected to a host processor or other PPUs 1200 via one or more high-speed NVLink 1210 interconnect. The PPU 1200 may be connected to a host processor or other peripheral devices via an interconnect 1202. The PPU 1200 may also be connected to a local memory comprising a number of memory devices 1204. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 1210 interconnect enables systems to scale and include one or more PPUs 1200 combined with one or more CPUs, supports cache coherence between the PPUs 1200 and CPUs, and CPU mastering. Data and/or commands may be transmitted by the NVLink 1210 through the hub 1230 to/from other units of the PPU 1200 such as one or more copy engines, a video encoder, a video decoder, a power management unit, etc. (not explicitly shown). The NVLink 1210 is described in more detail in conjunction with FIG. 14B.

The I/O unit 1205 is configured to transmit and receive communications (e.g., commands, data, etc.) from a host processor (not shown) over the interconnect 1202. The I/O unit 1205 may communicate with the host processor directly via the interconnect 1202 or through one or more intermediate devices such as a memory bridge. In an embodiment, the I/O unit 1205 may communicate with one or more other processors, such as one or more the PPUs 1200 via the interconnect 1202. In an embodiment, the I/O unit 1205 implements a Peripheral Component Interconnect Express (PCIe) interface for communications over a PCIe bus and the interconnect 1202 is a PCIe bus. In alternative embodiments, the I/O unit 1205 may implement other types of well-known interfaces for communicating with external devices.

The I/O unit 1205 decodes packets received via the interconnect 1202. In an embodiment, the packets represent commands configured to cause the PPU 1200 to perform various operations. The I/O unit 1205 transmits the decoded commands to various other units of the PPU 1200 as the commands may specify. For example, some commands may be transmitted to the front end unit 1215. Other commands may be transmitted to the hub 1230 or other units of the PPU 1200 such as one or more copy engines, a video encoder, a video decoder, a power management unit, etc. (not explicitly shown). In other words, the I/O unit 1205 is configured to route communications between and among the various logical units of the PPU 1200.

In an embodiment, a program executed by the host processor encodes a command stream in a buffer that provides workloads to the PPU 1200 for processing. A workload may comprise several instructions and data to be processed by those instructions. The buffer is a region in a memory that is accessible (e.g., read/write) by both the host processor and the PPU 1200. For example, the I/O unit 1205 may be configured to access the buffer in a system memory connected to the interconnect 1202 via memory requests transmitted over the interconnect 1202. In an embodiment, the host processor writes the command stream to the buffer and then transmits a pointer to the start of the command stream to the PPU 1200. The front end unit 1215 receives pointers to one or more command streams. The front end unit 1215 manages the one or more streams, reading commands from the streams and forwarding commands to the various units of the PPU 1200.

The front end unit 1215 is coupled to a scheduler unit 1220 that configures the various GPCs 1250 to process tasks defined by the one or more streams. The scheduler unit 1220 is configured to track state information related to the various tasks managed by the scheduler unit 1220. The state may indicate which GPC 1250 a task is assigned to, whether the task is active or inactive, a priority level associated with the task, and so forth. The scheduler unit 1220 manages the execution of a plurality of tasks on the one or more GPCs 1250.

The scheduler unit 1220 is coupled to a work distribution unit 1225 that is configured to dispatch tasks for execution on the GPCs 1250. The work distribution unit 1225 may track a number of scheduled tasks received from the scheduler unit 1220. In an embodiment, the work distribution unit 1225 manages a pending task pool and an active task pool for each of the GPCs 1250. The pending task pool may comprise a number of slots (e.g., 32 slots) that contain tasks assigned to be processed by a particular GPC 1250. The active task pool may comprise a number of slots (e.g., 4 slots) for tasks that are actively being processed by the GPCs 1250. As a GPC 1250 finishes the execution of a task, that task is evicted from the active task pool for the GPC 1250 and one of the other tasks from the pending task pool is selected and scheduled for execution on the GPC 1250. If an active task has been idle on the GPC 1250, such as while waiting for a data dependency to be resolved, then the active task may be evicted from the GPC 1250 and returned to the pending task pool while another task in the pending task pool is selected and scheduled for execution on the GPC 1250.

The work distribution unit 1225 communicates with the one or more GPCs 1250 via XBar 1270. The XBar 1270 is an interconnect network that couples many of the units of the PPU 1200 to other units of the PPU 1200. For example, the XBar 1270 may be configured to couple the work distribution unit 1225 to a particular GPC 1250. Although not shown explicitly, one or more other units of the PPU 1200 may also be connected to the XBar 1270 via the hub 1230.

The tasks are managed by the scheduler unit 1220 and dispatched to a GPC 1250 by the work distribution unit 1225. The GPC 1250 is configured to process the task and generate results. The results may be consumed by other tasks within the GPC 1250, routed to a different GPC 1250 via the XBar 1270, or stored in the memory 1204. The results can be written to the memory 1204 via the memory partition units 1280, which implement a memory interface for reading and writing data to/from the memory 1204. The results can be transmitted to another PPU 1204 or CPU via the NVLink 1210. In an embodiment, the PPU 1200 includes a number U of memory partition units 1280 that is equal to the number of separate and distinct memory devices 1204 coupled to the PPU 1200. A memory partition unit 1280 will be described in more detail below in conjunction with FIG. 13B.

In an embodiment, a host processor executes a driver kernel that implements an application programming interface (API) that enables one or more applications executing on the host processor to schedule operations for execution on the PPU 1200. In an embodiment, multiple compute applications are simultaneously executed by the PPU 1200 and the PPU 1200 provides isolation, quality of service (QOS), and independent address spaces for the multiple compute applications. An application may generate instructions (e.g., API calls) that cause the driver kernel to generate one or more tasks for execution by the PPU 1200. The driver kernel outputs tasks to one or more streams being processed by the PPU 1200. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 14A.

Figure 13A:
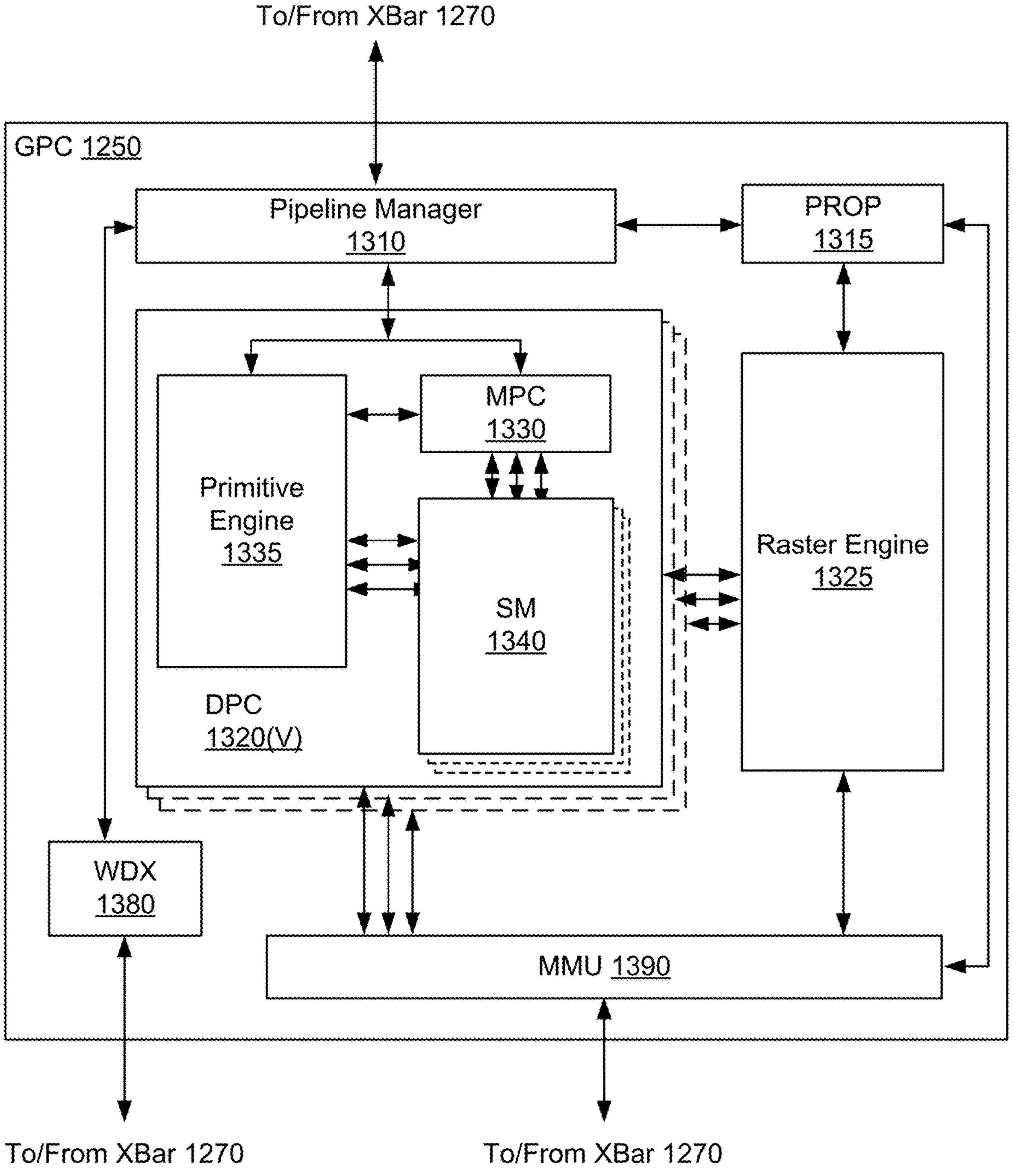
FIG. 13A illustrates a general processing cluster within the parallel processing unit of FIG. 12, in accordance with an embodiment.

FIG. 13A illustrates a GPC 1250 of the PPU 1200 of FIG. 12, in accordance with an embodiment. As shown in FIG. 13A, each GPC 1250 includes a number of hardware units for processing tasks. In an embodiment, each GPC 1250 includes a pipeline manager 1310, a pre-raster operations unit (PROP) 1315, a raster engine 1325, a work distribution crossbar (WDX) 1380, a memory management unit (MMU) 1390, and one or more Data Processing Clusters (DPCs) 1320. It will be appreciated that the GPC 1250 of FIG. 13A may include other hardware units in lieu of or in addition to the units shown in FIG. 13A.

In an embodiment, the operation of the GPC 1250 is controlled by the pipeline manager 1310. The pipeline manager 1310 manages the configuration of the one or more DPCs 1320 for processing tasks allocated to the GPC 1250. In an embodiment, the pipeline manager 1310 may configure at least one of the one or more DPCs 1320 to implement at least a portion of a graphics rendering pipeline. For example, a DPC 1320 may be configured to execute a vertex shader program on the programmable streaming multiprocessor (SM) 1340. The pipeline manager 1310 may also be configured to route packets received from the work distribution unit 1225 to the appropriate logical units within the GPC 1250. For example, some packets may be routed to fixed function hardware units in the PROP 1315 and/or raster engine 1325 while other packets may be routed to the DPCs 1320 for processing by the primitive engine 1335 or the SM 1340. In an embodiment, the pipeline manager 1310 may configure at least one of the one or more DPCs 1320 to implement a neural network model and/or a computing pipeline.

Figure 13B:
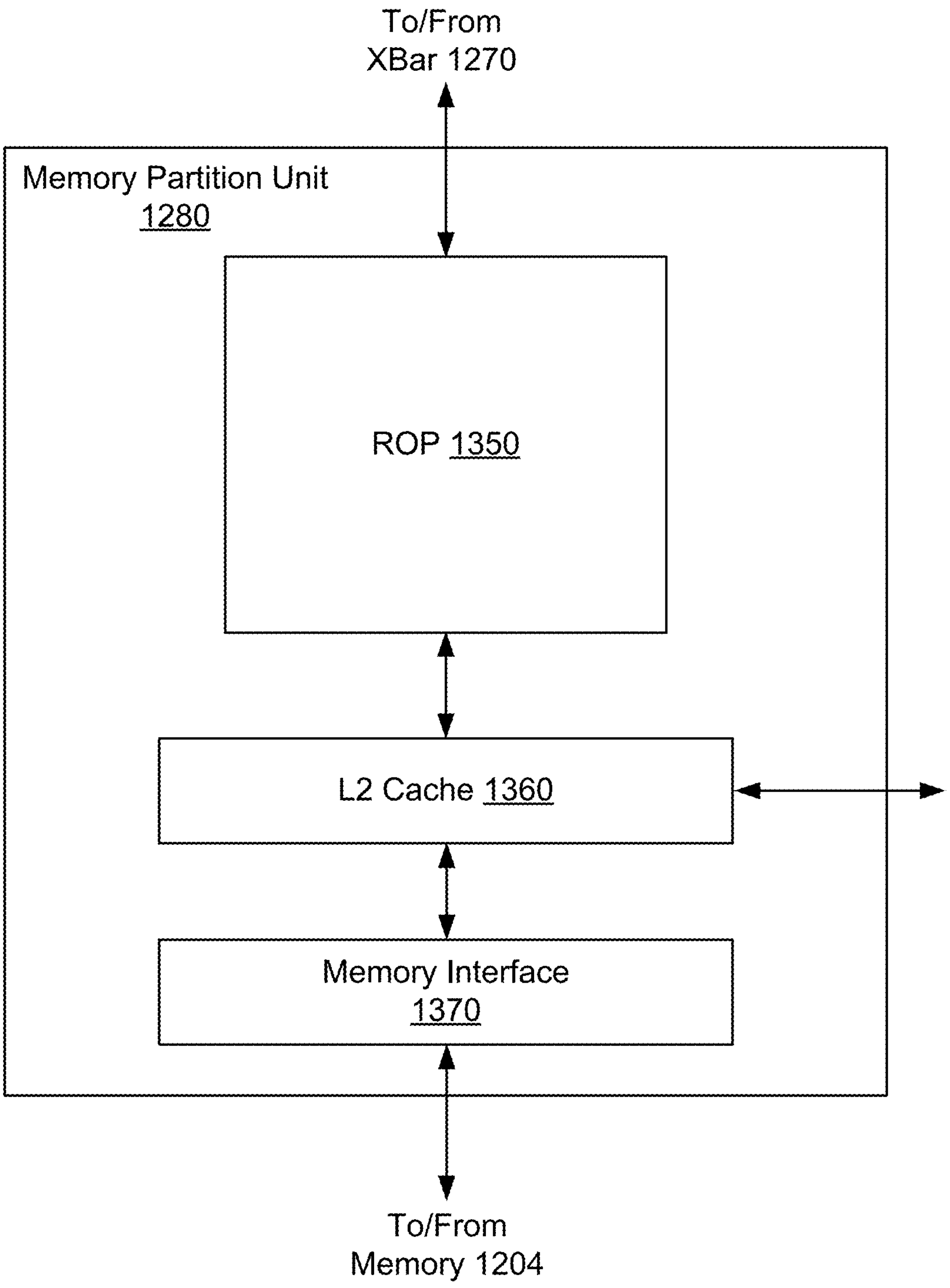
FIG. 13B illustrates a memory partition unit of the parallel processing unit of FIG. 3, in accordance with an embodiment.

The PROP unit 1315 is configured to route data generated by the raster engine 1325 and the DPCs 1320 to a Raster Operations (ROP) unit, described in more detail in conjunction with FIG. 13B. The PROP unit 1315 may also be configured to perform optimizations for color blending, organize pixel data, perform address translations, and the like.

The raster engine 1325 includes a number of fixed function hardware units configured to perform various raster operations. In an embodiment, the raster engine 1325 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1325 comprises fragments to be processed, for example, by a fragment shader implemented within a DPC 1320.

Each DPC 1320 included in the GPC 1250 includes an M-Pipe Controller (MPC) 1330, a primitive engine 1335, and one or more SMs 1340. The MPC 1330 controls the operation of the DPC 1320, routing packets received from the pipeline manager 1310 to the appropriate units in the DPC 1320. For example, packets associated with a vertex may be routed to the primitive engine 1335, which is configured to fetch vertex attributes associated with the vertex from the memory 1204. In contrast, packets associated with a shader program may be transmitted to the SM 1340.

The SM 1340 comprises a programmable streaming processor that is configured to process tasks represented by a number of threads. Each SM 1340 is multi-threaded and configured to execute a plurality of threads (e.g., 32 threads) from a particular group of threads concurrently. In an embodiment, the SM 1340 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 1340 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 1340 will be described in more detail below in conjunction with FIG. 14A.

The MMU 1390 provides an interface between the GPC 1250 and the memory partition unit 1280. The MMU 1390 may provide translation of virtual addresses into physical addresses, memory protection, and arbitration of memory requests. In an embodiment, the MMU 1390 provides one or more translation lookaside buffers (TLBs) for performing translation of virtual addresses into physical addresses in the memory 1204.

FIG. 13B illustrates a memory partition unit 1280 of the PPU 1200 of FIG. 12, in accordance with an embodiment. As shown in FIG. 13B, the memory partition unit 1280 includes a Raster Operations (ROP) unit 1350, a level two (L2) cache 1360, and a memory interface 1370. The memory interface 1370 is coupled to the memory 1204. Memory interface 1370 may implement 32, 64, 128, 1024-bit data buses, or the like, for high-speed data transfer. In an embodiment, the PPU 1200 incorporates U memory interfaces 1370, one memory interface 1370 per pair of memory partition units 1280, where each pair of memory partition units 1280 is connected to a corresponding memory device 1204. For example, PPU 1200 may be connected to up to Y memory devices 1204, such as high bandwidth memory stacks or graphics double-data-rate, version 5, synchronous dynamic random access memory, or other types of persistent storage.

In an embodiment, the memory interface 1370 implements an HBM2 memory interface and Y equals half U. In an embodiment, the HBM2 memory stacks are located on the same physical package as the PPU 1200, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1204 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 1200 process very large datasets and/or run applications for extended periods.

In an embodiment, the PPU 1200 implements a multi-level memory hierarchy. In an embodiment, the memory partition unit 1280 supports a unified memory to provide a single unified virtual address space for CPU and PPU 1200 memory, enabling data sharing between virtual memory systems. In an embodiment the frequency of accesses by a PPU 1200 to memory located on other processors is traced to ensure that memory pages are moved to the physical memory of the PPU 1200 that is accessing the pages more frequently. In an embodiment, the NVLink 1210 supports address translation services allowing the PPU 1200 to directly access a CPU's page tables and providing full access to CPU memory by the PPU 1200.

In an embodiment, copy engines transfer data between multiple PPUs 1200 or between PPUs 1200 and CPUs. The copy engines can generate page faults for addresses that are not mapped into the page tables. The memory partition unit 1280 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1204 or other system memory may be fetched by the memory partition unit 1280 and stored in the L2 cache 1360, which is located on-chip and is shared between the various GPCs 1250. As shown, each memory partition unit 1280 includes a portion of the L2 cache 1360 associated with a corresponding memory device 1204. Lower level caches may then be implemented in various units within the GPCs 1250. For example, each of the SMs 1340 may implement a level one (L1) cache. The L1 cache is private memory that is dedicated to a particular SM 1340. Data from the L2 cache 1360 may be fetched and stored in each of the L1 caches for processing in the functional units of the SMs 1340. The L2 cache 1360 is coupled to the memory interface 1370 and the XBar 1270.

The ROP unit 1350 performs graphics raster operations related to pixel color, such as color compression, pixel blending, and the like. The ROP unit 1350 also implements depth testing in conjunction with the raster engine 1325, receiving a depth for a sample location associated with a pixel fragment from the culling engine of the raster engine 1325. The depth is tested against a corresponding depth in a depth buffer for a sample location associated with the fragment. If the fragment passes the depth test for the sample location, then the ROP unit 1350 updates the depth buffer and transmits a result of the depth test to the raster engine 1325. It will be appreciated that the number of memory partition units 1280 may be different than the number of GPCs 1250 and, therefore, each ROP unit 1350 may be coupled to each of the GPCs 1250. The ROP unit 1350 tracks packets received from the different GPCs 1250 and determines which GPC 1250 that a result generated by the ROP unit 1350 is routed to through the Xbar 1270. Although the ROP unit 1350 is included within the memory partition unit 1280 in FIG. 13B, in other embodiment, the ROP unit 1350 may be outside of the memory partition unit 1280. For example, the ROP unit 1350 may reside in the GPC 1250 or another unit.

Figure 14A:
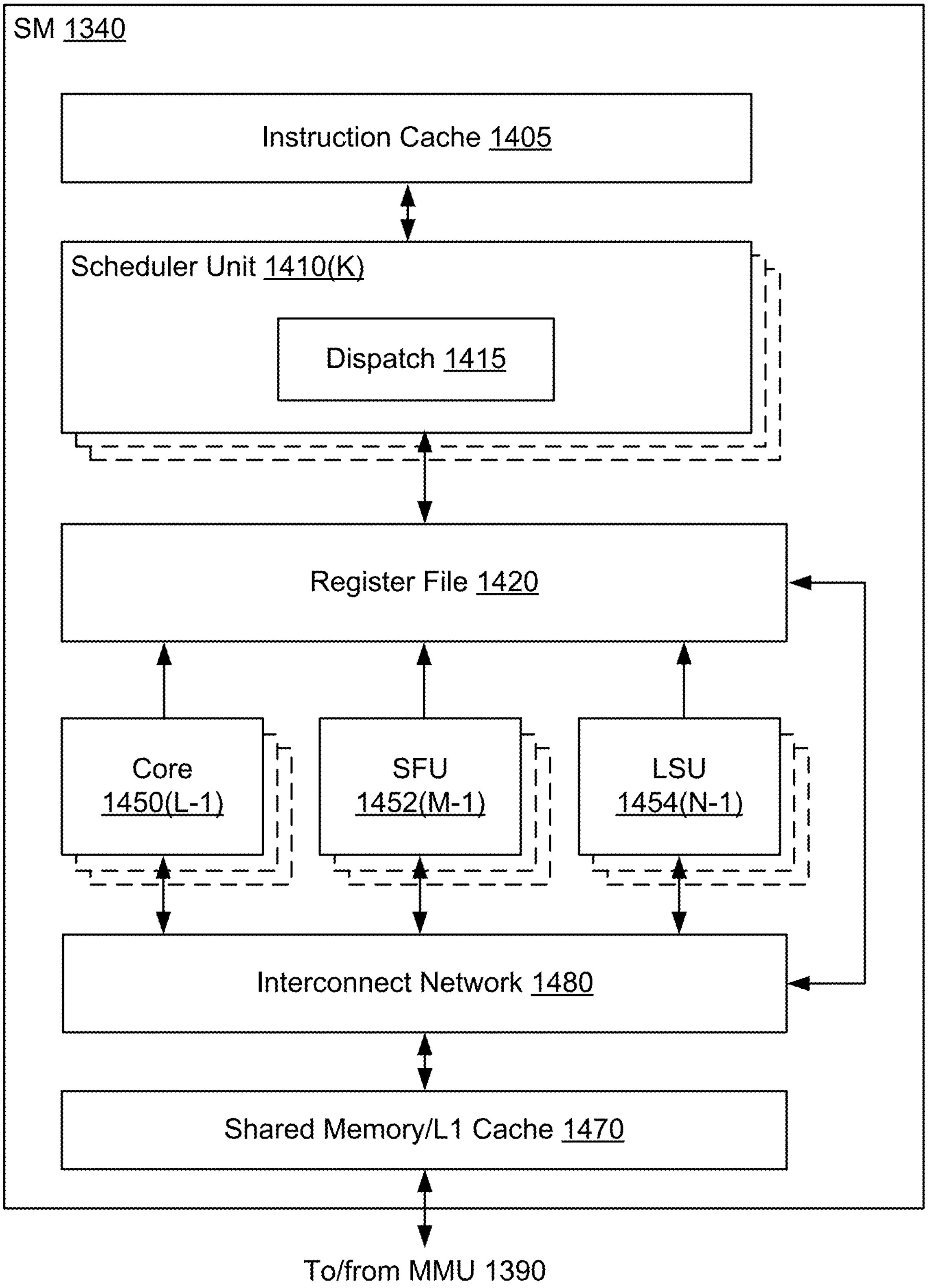
FIG. 14A illustrates the streaming multi-processor of FIG. 13A, in accordance with an embodiment.

FIG. 14A illustrates the streaming multi-processor 1340 of FIG. 13A, in accordance with an embodiment. As shown in FIG. 14A, the SM 1340 includes an instruction cache 1405, one or more scheduler units 1410, a register file 1420, one or more processing cores 1450, one or more special function units (SFUs) 1452, one or more load/store units (LSUs) 1454, an interconnect network 1480, a shared memory/L1 cache 1470.

As described above, the work distribution unit 1225 dispatches tasks for execution on the GPCs 1250 of the PPU 1200. The tasks are allocated to a particular DPC 1320 within a GPC 1250 and, if the task is associated with a shader program, the task may be allocated to an SM 1340. The scheduler unit 1410 receives the tasks from the work distribution unit 1225 and manages instruction scheduling for one or more thread blocks assigned to the SM 1340. The scheduler unit 1410 schedules thread blocks for execution as warps of parallel threads, where each thread block is allocated at least one warp. In an embodiment, each warp executes 122 threads. The scheduler unit 1410 may manage a plurality of different thread blocks, allocating the warps to the different thread blocks and then dispatching instructions from the plurality of different cooperative groups to the various functional units (e.g., cores 1450, SFUs 1452, and LSUs 1454) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads ( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 1415 is configured to transmit instructions to one or more of the functional units. In the embodiment, the scheduler unit 1410 includes two dispatch units 1415 that enable two different instructions from the same warp to be dispatched during each clock cycle. In alternative embodiments, each scheduler unit 1410 may include a single dispatch unit 1415 or additional dispatch units 1415.

Each SM 1340 includes a register file 1420 that provides a set of registers for the functional units of the SM 1340. In an embodiment, the register file 1420 is divided between each of the functional units such that each functional unit is allocated a dedicated portion of the register file 1420. In another embodiment, the register file 1420 is divided between the different warps being executed by the SM 1340. The register file 1420 provides temporary storage for operands connected to the data paths of the functional units.

Each SM 1340 comprises Z processing cores 1450. In an embodiment, the SM 1340 includes a large number (e.g., 128, etc.) of distinct processing cores 1450. Each core 1450 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 1450 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 1450. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 122-bit floating point matrices. Tensor Cores operate on 16-bit floating point input data with 122-bit floating point accumulation. The 16-bit floating point multiply requires 64 operations and results in a full precision product that is then accumulated using 122-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 122 threads of the warp.

Each SM 1340 also comprises M SFUs 1452 that perform special functions (e.g., attribute evaluation, reciprocal square root, and the like). In an embodiment, the SFUs 1452 may include a tree traversal unit configured to traverse a hierarchical trec data structure. In an embodiment, the SFUs 1452 may include texture unit configured to perform texture map filtering operations. In an embodiment, the texture units are configured to load texture maps (e.g., a 2D array of texels) from the memory 1204 and sample the texture maps to produce sampled texture values for use in shader programs executed by the SM 1340. In an embodiment, the texture maps are stored in the shared memory/L1 cache 1370. The texture units implement texture operations such as filtering operations using mip-maps (e.g., texture maps of varying levels of detail). In an embodiment, each SM 1240 includes two texture units.

Each SM 1340 also comprises N LSUs 1454 that implement load and store operations between the shared memory/L1 cache 1470 and the register file 1420. Each SM 1340 includes an interconnect network 1480 that connects each of the functional units to the register file 1420 and the LSU 1454 to the register file 1420, shared memory/L1 cache 1470. In an embodiment, the interconnect network 1480 is a crossbar that can be configured to connect any of the functional units to any of the registers in the register file 1420 and connect the LSUs 1454 to the register file and memory locations in shared memory/L1 cache 1470.

The shared memory/L1 cache 1470 is an array of on-chip memory that allows for data storage and communication between the SM 1340 and the primitive engine 1335 and between threads in the SM 1340. In an embodiment, the shared memory/L1 cache 1470 comprises 128 KB of storage capacity and is in the path from the SM 1340 to the memory partition unit 1280. The shared memory/L1 cache 1470 can be used to cache reads and writes. One or more of the shared memory/L1 cache 1470, L2 cache 1360, and memory 1204 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1470 enables the shared memory/L1 cache 1470 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 12, are bypassed, creating a much simpler programming model. In the general purpose parallel computation configuration, the work distribution unit 1225 assigns and distributes blocks of threads directly to the DPCs 1320. The threads in a block execute the same program, using a unique thread ID in the calculation to ensure each thread generates unique results, using the SM 1340 to execute the program and perform calculations, shared memory/L1 cache 1470 to communicate between threads, and the LSU 1454 to read and write global memory through the shared memory/L1 cache 1470 and the memory partition unit 1280. When configured for general purpose parallel computation, the SM 1340 can also write commands that the scheduler unit 1220 can use to launch new work on the DPCs 1320.

The PPU 1200 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 1200 is embodied on a single semiconductor substrate. In another embodiment, the PPU 1200 is included in a system-on-a-chip (SoC) along with one or more other devices such as additional PPUs 1200, the memory 1204, a reduced instruction set computer (RISC) CPU, a memory management unit (MMU), a digital-to-analog converter (DAC), and the like.

In an embodiment, the PPU 1200 may be included on a graphics card that includes one or more memory devices 1204. The graphics card may be configured to interface with a PCIe slot on a motherboard of a desktop computer. In yet another embodiment, the PPU 1200 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 14B:
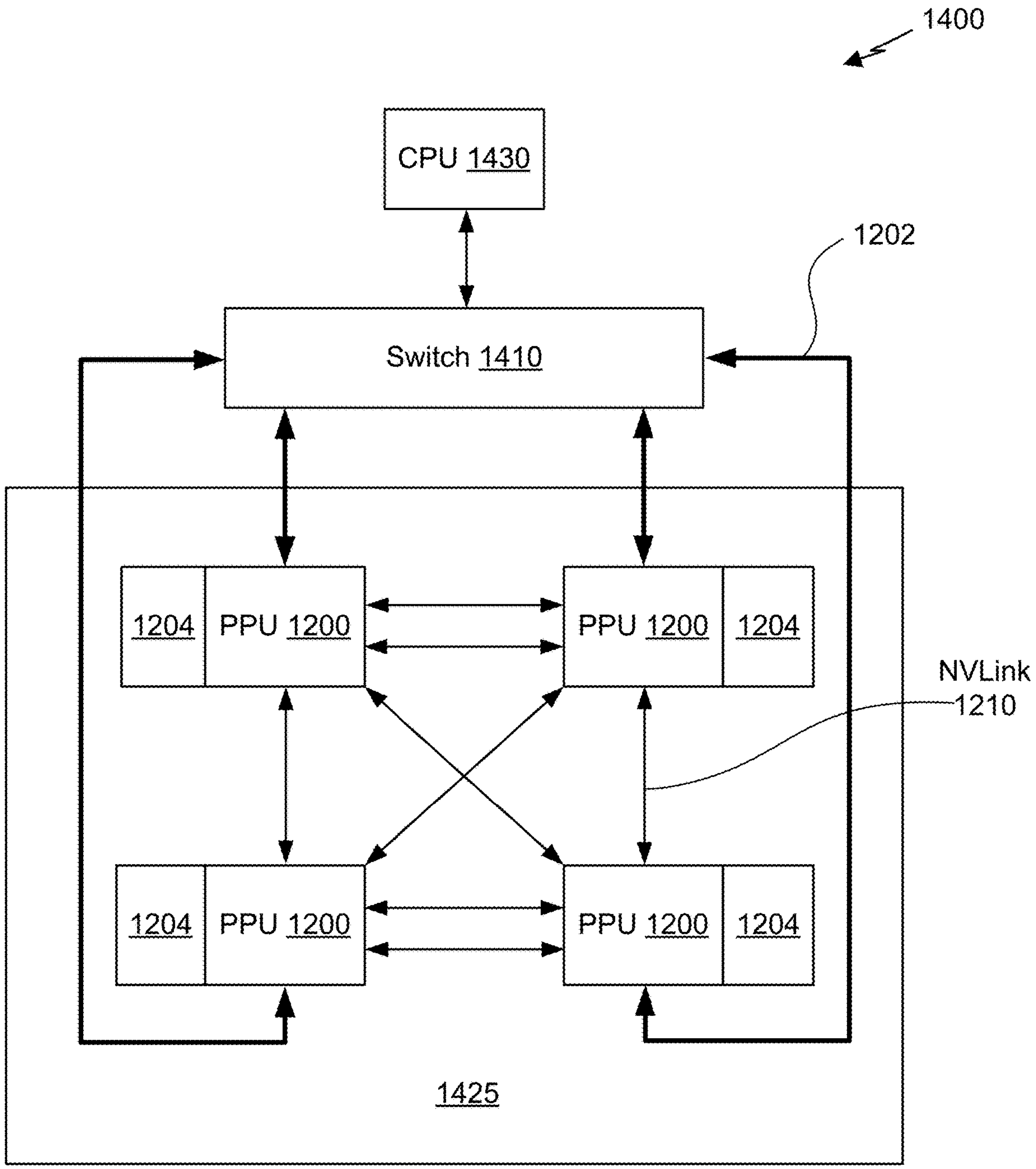
FIG. 14B is a conceptual diagram of a processing system implemented using the PPU of FIG. 12, in accordance with an embodiment.

FIG. 14B is a conceptual diagram of a processing system 1400 implemented using the PPU 1200 of FIG. 12, in accordance with an embodiment. The exemplary system 1465 may be configured to implement the method 100 shown in FIG. 1. The processing system 1400 includes a CPU 1430, switch 1410, and multiple PPUs 1200 each and respective memories 1204. The NVLink 1210 provides high-speed communication links between each of the PPUs 1200. Although a particular number of NVLink 1210 and interconnect 1202 connections are illustrated in FIG. 14B, the number of connections to each PPU 1200 and the CPU 1430 may vary. The switch 1410 interfaces between the interconnect 1202 and the CPU 1430. The PPUs 1200, memories 1204, and NVLinks 1210 may be situated on a single semiconductor platform to form a parallel processing module 1425. In an embodiment, the switch 1410 supports two or more protocols to interface between various different connections and/or links.

In another embodiment (not shown), the NVLink 1210 provides one or more high-speed communication links between each of the PPUs 1200 and the CPU 1430 and the switch 1410 interfaces between the interconnect 1202 and each of the PPUs 1200. The PPUs 1200, memories 1204, and interconnect 1202 may be situated on a single semiconductor platform to form a parallel processing module 1425. In yet another embodiment (not shown), the interconnect 1202 provides one or more communication links between each of the PPUs 1200 and the CPU 1430 and the switch 1410 interfaces between each of the PPUs 1200 using the NVLink 1210 to provide one or more high-speed communication links between the PPUs 1200. In another embodiment (not shown), the NVLink 1210 provides one or more high-speed communication links between the PPUs 1200 and the CPU 1430 through the switch 1410. In yet another embodiment (not shown), the interconnect 1202 provides one or more communication links between each of the PPUs 1200 directly. One or more of the NVLink 1210 high-speed communication links may be implemented as a physical NVLink interconnect or either an on-chip or on-die interconnect using the same protocol as the NVLink 1210.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1425 may be implemented as a circuit board substrate and each of the PPUs 1200 and/or memories 1204 may be packaged devices. In an embodiment, the CPU 1430, switch 1410, and the parallel processing module 1425 are situated on a single semiconductor platform.

In an embodiment, the signaling rate of each NVLink 1210 is 20 to 25 Gigabits/second and each PPU 1200 includes six NVLink 1210 interfaces (as shown in FIG. 14B, five NVLink 1210 interfaces are included for each PPU 1200). Each NVLink 1210 provides a data transfer rate of 25 Gigabytes/second in each direction, with six links providing 1200 Gigabytes/second. The NVLinks 1210 can be used exclusively for PPU-to-PPU communication as shown in FIG. 14B, or some combination of PPU-to-PPU and PPU-to-CPU, when the CPU 1430 also includes one or more NVLink 1210 interfaces.

In an embodiment, the NVLink 1210 allows direct load/store/atomic access from the CPU 1430 to each PPU's 1200 memory 1204. In an embodiment, the NVLink 1210 supports coherency operations, allowing data read from the memories 1204 to be stored in the cache hierarchy of the CPU 1430, reducing cache access latency for the CPU 1430. In an embodiment, the NVLink 1210 includes support for Address Translation Services (ATS), allowing the PPU 1200 to directly access page tables within the CPU 1430. One or more of the NVLinks 1210 may also be configured to operate in a low-power mode.

Figure 14C:
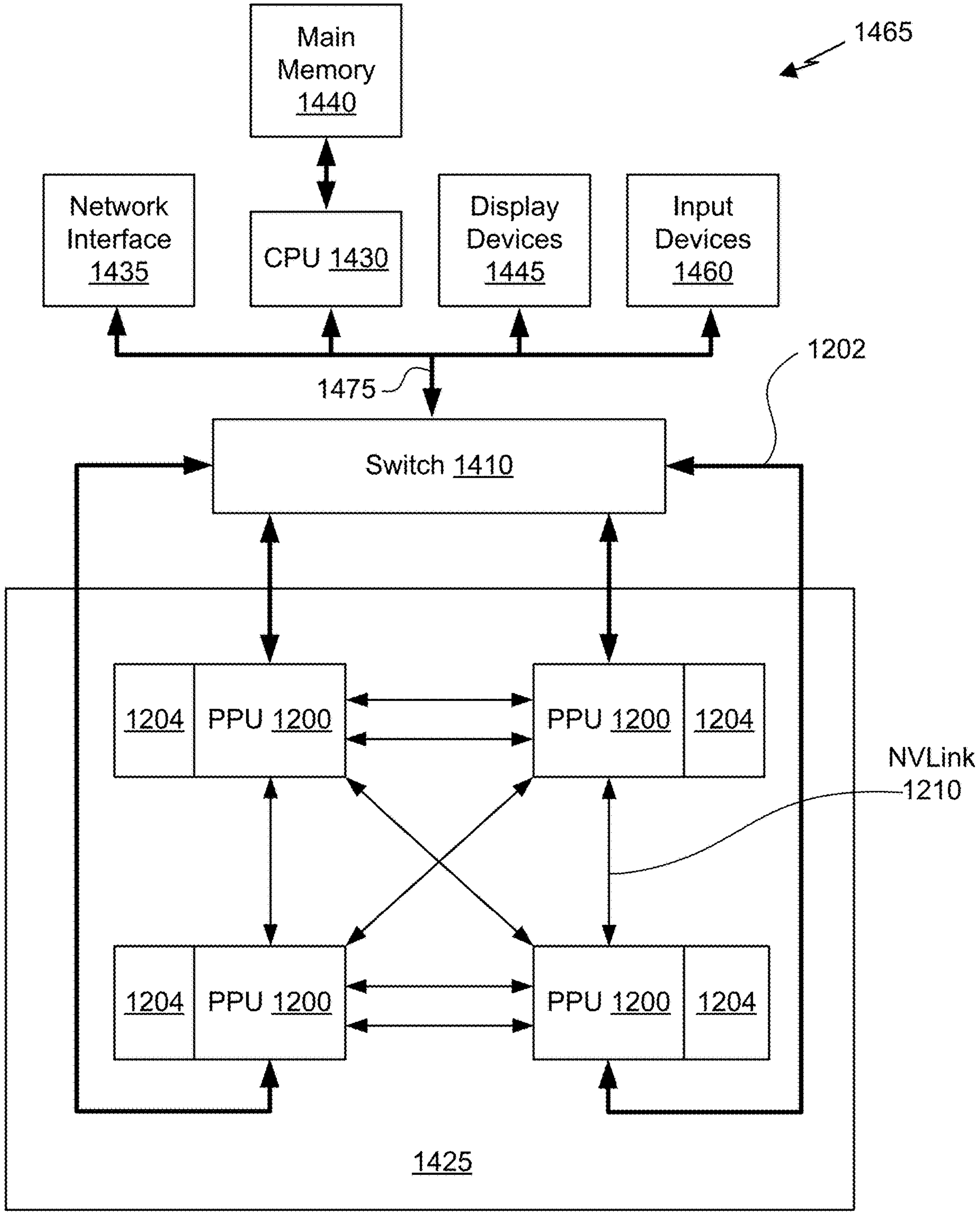
FIG. 14C illustrates an exemplary system in which the various architecture and/or functionality of the various previous embodiments may be implemented.

FIG. 14C illustrates an exemplary system 1465 in which the various architecture and/or functionality of the various previous embodiments may be implemented. The exemplary system 1465 may be configured to implement the method 100 shown in FIG. 1.

As shown, a system 1465 is provided including at least one central processing unit 1430 that is connected to a communication bus 1475. The communication bus 1475 may be implemented using any suitable protocol, such as PCI (Peripheral Component Interconnect), PCI-Express, AGP (Accelerated Graphics Port), HyperTransport, or any other bus or point-to-point communication protocol(s). The system 1465 also includes a main memory 1440. Control logic (software) and data are stored in the main memory 1440 which may take the form of random access memory (RAM).

The system 1465 also includes input devices 1460, the parallel processing system 1425, and display devices 1445, e.g. a conventional CRT (cathode ray tube), LCD (liquid crystal display), LED (light emitting diode), plasma display or the like. User input may be received from the input devices 1460, e.g., keyboard, mouse, touchpad, microphone, and the like. Each of the foregoing modules and/or devices may even be situated on a single semiconductor platform to form the system 1465. Alternately, the various modules may also be situated separately or in various combinations of semiconductor platforms per the desires of the user.

Further, the system 1465 may be coupled to a network (e.g., a telecommunications network, local area network (LAN), wireless network, wide area network (WAN) such as the Internet, peer-to-peer network, cable network, or the like) through a network interface 1435 for communication purposes.

The system 1465 may also include a secondary storage (not shown). The secondary storage 1510 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1440 and/or the secondary storage. Such computer programs, when executed, enable the system 1465 to perform various functions. The memory 1440, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 1465 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 1200 comprises a graphics processing unit (GPU). The PPU 1200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 1200 can be configured to process the graphics primitives to generate a frame buffer (e.g., pixel data for each of the pixels of the display).

An application writes model data for a scene (e.g., a collection of vertices and attributes) to a memory such as a system memory or memory 1204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 1340 of the PPU 1200 including one or more of a vertex shader, hull shader, domain shader, geometry shader, and a pixel shader. For example, one or more of the SMs 1340 may be configured to execute a vertex shader program that processes a number of vertices defined by the model data. In an embodiment, the different SMs 1340 may be configured to execute different shader programs concurrently. For example, a first subset of SMs 1340 may be configured to execute a vertex shader program while a second subset of SMs 1340 may be configured to execute a pixel shader program. The first subset of SMs 1340 processes vertex data to produce processed vertex data and writes the processed vertex data to the L2 cache 1360 and/or the memory 1204. After the processed vertex data is rasterized (e.g., transformed from three-dimensional data into two-dimensional data in screen space) to produce fragment data, the second subset of SMs 1340 executes a pixel shader to produce processed fragment data, which is then blended with other processed fragment data and written to the frame buffer in memory 1204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 15:
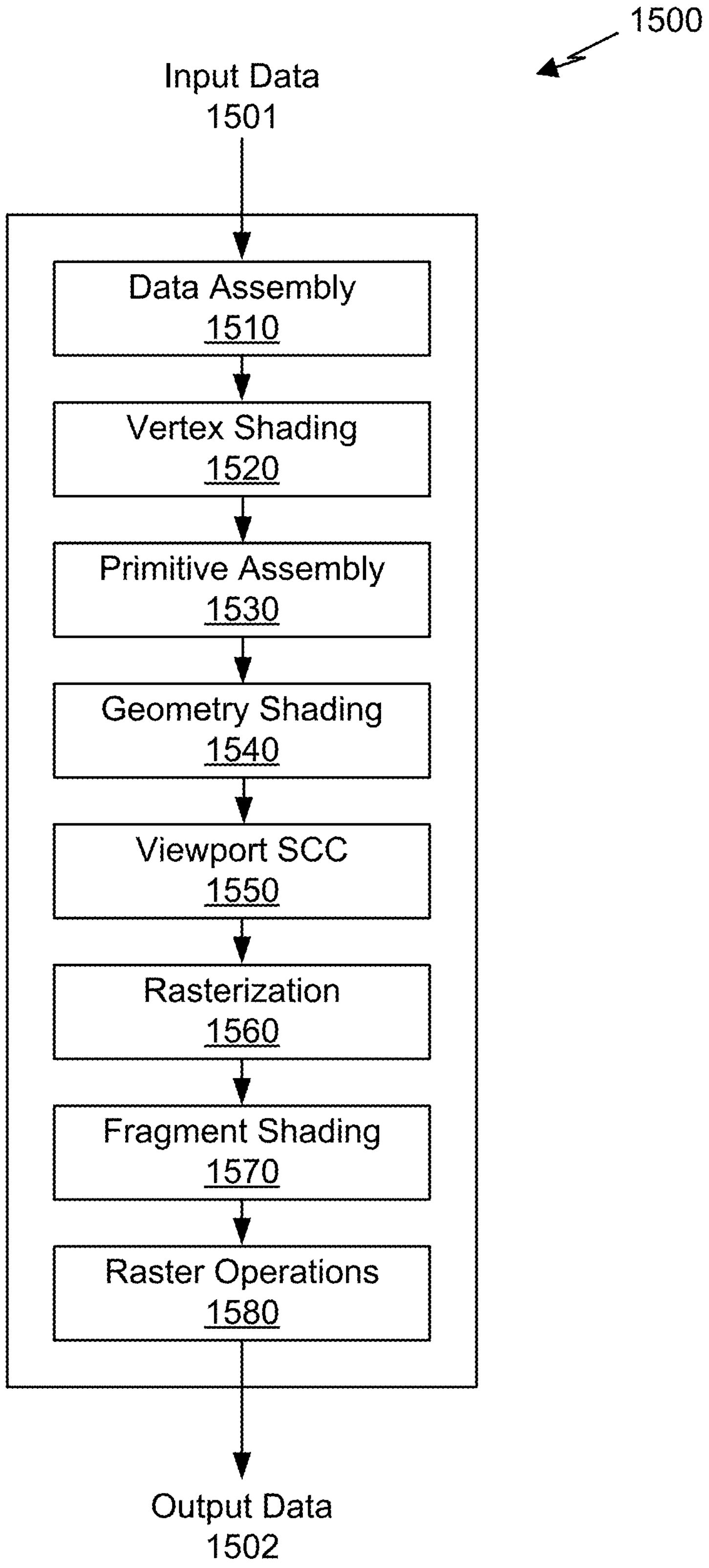
FIG. 15 is a conceptual diagram of a graphics processing pipeline implemented by the PPU of FIG. 12, in accordance with an embodiment.

FIG. 15 is a conceptual diagram of a graphics processing pipeline 1500 implemented by the PPU 1200 of FIG. 12, in accordance with an embodiment. The graphics processing pipeline 1500 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1500 receives input data 1501 that is transmitted from one stage to the next stage of the graphics processing pipeline 1500 to generate output data 1502. In an embodiment, the graphics processing pipeline 1500 may represent a graphics processing pipeline defined by the OpenGL® API. As an option, the graphics processing pipeline 1500 may be implemented in the context of the functionality and architecture of the previous Figures and/or any subsequent Figure(s).

As shown in FIG. 15, the graphics processing pipeline 1500 comprises a pipeline architecture that includes a number of stages. The stages include, but are not limited to, a data assembly stage 1510, a vertex shading stage 1520, a primitive assembly stage 1530, a geometry shading stage 1540, a viewport scale, cull, and clip (VSCC) stage 1550, a rasterization stage 1560, a fragment shading stage 1570, and a raster operations stage 1580. In an embodiment, the input data 1501 comprises commands that configure the processing units to implement the stages of the graphics processing pipeline 1500 and geometric primitives (e.g., points, lines, triangles, quads, triangle strips or fans, etc.) to be processed by the stages. The output data 1502 may comprise pixel data (e.g., color data) that is copied into a frame buffer or other type of surface data structure in a memory.

The data assembly stage 1510 receives the input data 1501 that specifies vertex data for high-order surfaces, primitives, or the like. The data assembly stage 1510 collects the vertex data in a temporary storage or queue, such as by receiving a command from the host processor that includes a pointer to a buffer in memory and reading the vertex data from the buffer. The vertex data is then transmitted to the vertex shading stage 1520 for processing.

The vertex shading stage 1520 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 1520 may manipulate individual vertex attributes such as position, color, texture coordinates, and the like. In other words, the vertex shading stage 1520 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 1520 generates transformed vertex data that is transmitted to the primitive assembly stage 1530.

The primitive assembly stage 1530 collects vertices output by the vertex shading stage 1520 and groups the vertices into geometric primitives for processing by the geometry shading stage 1540. For example, the primitive assembly stage 1530 may be configured to group every three consecutive vertices as a geometric primitive (e.g., a triangle) for transmission to the geometry shading stage 1540. In some embodiments, specific vertices may be reused for consecutive geometric primitives (e.g., two consecutive triangles in a triangle strip may share two vertices). The primitive assembly stage 1530 transmits geometric primitives (e.g., a collection of associated vertices) to the geometry shading stage 1540.

The geometry shading stage 1540 processes geometric primitives by performing a set of operations (e.g., a geometry shader or program) on the geometric primitives. Tessellation operations may generate one or more geometric primitives from each geometric primitive. In other words, the geometry shading stage 1540 may subdivide each geometric primitive into a finer mesh of two or more geometric primitives for processing by the rest of the graphics processing pipeline 1500. The geometry shading stage 1540 transmits geometric primitives to the viewport SCC stage 1550.

In an embodiment, the graphics processing pipeline 1500 may operate within a streaming multiprocessor and the vertex shading stage 1520, the primitive assembly stage 1530, the geometry shading stage 1540, the fragment shading stage 1570, and/or hardware/software associated therewith, may sequentially perform processing operations. Once the sequential processing operations are complete, in an embodiment, the viewport SCC stage 1550 may utilize the data. In an embodiment, primitive data processed by one or more of the stages in the graphics processing pipeline 1500 may be written to a cache (e.g. L1 cache, a vertex cache, etc.). In this case, in an embodiment, the viewport SCC stage 1550 may access the data in the cache. In an embodiment, the viewport SCC stage 1550 and the rasterization stage 1560 are implemented as fixed function circuitry.

The viewport SCC stage 1550 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 1560.

The rasterization stage 1560 converts the 3D geometric primitives into 2D fragments (e.g. capable of being utilized for display, etc.). The rasterization stage 1560 may be configured to utilize the vertices of the geometric primitives to setup a set of plane equations from which various attributes can be interpolated. The rasterization stage 1560 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 1560 generates fragment data (e.g., interpolated vertex attributes associated with a particular sample location for each covered pixel) that are transmitted to the fragment shading stage 1570.

The fragment shading stage 1570 processes fragment data by performing a set of operations (e.g., a fragment shader or a program) on each of the fragments. The fragment shading stage 1570 may generate pixel data (e.g., color values) for the fragment such as by performing lighting operations or sampling texture maps using interpolated texture coordinates for the fragment. The fragment shading stage 1570 generates pixel data that is transmitted to the raster operations stage 1580.

The raster operations stage 1580 may perform various operations on the pixel data such as performing alpha tests, stencil tests, and blending the pixel data with other pixel data corresponding to other fragments associated with the pixel. When the raster operations stage 1580 has finished processing the pixel data (e.g., the output data 1502), the pixel data may be written to a render target such as a frame buffer, a color buffer, or the like.

It will be appreciated that one or more additional stages may be included in the graphics processing pipeline 1500 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 1540). Other types of graphics processing pipelines are contemplated as being within the scope of the present disclosure. Furthermore, any of the stages of the graphics processing pipeline 1500 may be implemented by one or more dedicated hardware units within a graphics processor such as PPU 1200. Other stages of the graphics processing pipeline 1500 may be implemented by programmable hardware units such as the SM 1340 of the PPU 1200.

The graphics processing pipeline 1500 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 1200. The API provides an abstraction for a programmer that lets a programmer utilize specialized graphics hardware, such as the PPU 1200, to generate the graphical data without requiring the programmer to utilize the specific instruction set for the PPU 1200. The application may include an API call that is routed to the device driver for the PPU 1200. The device driver interprets the API call and performs various operations to respond to the API call. In some instances, the device driver may perform operations by executing instructions on the CPU. In other instances, the device driver may perform operations, at least in part, by launching operations on the PPU 1200 utilizing an input/output interface between the CPU and the PPU 1200. In an embodiment, the device driver is configured to implement the graphics processing pipeline 1500 utilizing the hardware of the PPU 1200.

Various programs may be executed within the PPU 1200 in order to implement the various stages of the graphics processing pipeline 1500. For example, the device driver may launch a kernel on the PPU 1200 to perform the vertex shading stage 1520 on one SM 1340 (or multiple SMs 1340). The device driver (or the initial kernel executed by the PPU 1300) may also launch other kernels on the PPU 1300 to perform other stages of the graphics processing pipeline 1500, such as the geometry shading stage 1540 and the fragment shading stage 1570. In addition, some of the stages of the graphics processing pipeline 1500 may be implemented on fixed unit hardware such as a rasterizer or a data assembler implemented within the PPU 1300. It will be appreciated that results from one kernel may be processed by one or more intervening fixed function hardware units before being processed by a subsequent kernel on an SM 1340.

Machine Learning

Deep neural networks (DNNs) developed on processors, such as the PPU 1200 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 1200. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 1200 is a computing platform capable of delivering performance required for deep neural network-based artificial intelligence and machine learning applications.

What is claimed is:

1. A method, comprising:

at a device:

processing, in hardware, metadata defined for a program to be executed using a pipeline having one or more stages, wherein the metadata indicates:

one or more processing contexts, an assignment of each processing context of the one or more processing contexts to a corresponding stage of the one or more stages in the pipeline, and resources to be used for each stage of the one or more stages, and wherein the processing includes:

mapping the one or more processing contexts to one or more processing blocks of a processor core, sending each processing context of one or more processing contexts to a corresponding processing block of the one or more processing blocks, and using the metadata indicating the resources to be used for each stage of the one or more stages to allocate space in each processing block of the one or more processing blocks; and executing the one or more processing contexts on the processor core based on the mapping.

2. The method of claim 1, wherein the processing further includes:

selecting, based on the metadata, the processor core from among a plurality of processor cores to use for execution of the one or more processing contexts.

3. The method of claim 2, wherein the processor core is selected based on total dynamic resources required for all processing contexts.

4. The method of claim 3, wherein the resources include at least one of registers or scratchpad memory.

5. The method of claim 1, wherein the resources include a register and wherein the space is allocated in a shared register file.

6. The method of claim 1, wherein the mapping maps all processing contexts belonging to a same pipeline slice together on a same processing block.

7. The method of claim 1, wherein the processing further includes:

setting a program state for execution.

8. The method of claim 7, wherein the program state includes at least one of a memory buffer status, queue status, a pipeline stage identifier, or pipeline stage status.

9. The method of claim 8, wherein the queue status is a register file queue status.

10. The method of claim 9, wherein the register file queue status includes one of more of empty, full, or current number of elements stored.

11. The method of claim 8, wherein the pipeline stage status is a number of instructions executed.

12. The method of claim 1, wherein executing the one or more processing contexts on the processor core includes:

each processing block of the one or more processing blocks executing the processing context of the one or more processing contexts mapped thereto.

13. The method of claim 12, wherein executing the one or more processing contexts on the processor core is performed based on a prioritization policy.

14. The method of claim 13, wherein the prioritization policy uses a pipeline stage identifier included in a program state to determine a next processing context to execute based on a current stage of the pipeline.

15. The method of claim 13, wherein the prioritization policy uses a queue status included in a program state to determine a next processing context to execute.

16. The method of claim 15, wherein the queue status is a register file queue status.

17. The method of claim 1, wherein the hardware is a graphics processing unit (GPU).

18. A system, comprising:

hardware configured to:

process metadata defined for a program to be executed using a pipeline having one or more stages, wherein the metadata indicates:

one or more processing contexts, an assignment of each processing context of the one or more processing contexts to a corresponding stage of the one or more stages in the pipeline, and resources to be used for each stage of the one or more stages, and wherein the processing includes:

mapping the one or more processing contexts to one or more processing blocks of a processor core, sending each processing context of one or more processing contexts to a corresponding processing block of the one or more processing blocks, and using the metadata indicating the resources to be used for each stage of the one or more stages to allocate space in each processing block of the one or more processing blocks; and the processor core configured to:

execute the one or more processing contexts based on the mapping.

19. The system of claim 18, wherein the processing further includes:

selecting, based on the metadata, the processor core from among a plurality of processor cores to use for execution of the one or more processing contexts.

20. The system of claim 19, wherein the processor core is selected based on total dynamic resources required for all processing contexts.

21. The system of claim 20, wherein the resources include at least one of registers or scratchpad memory.

22. The system of claim 20, wherein the resources include a register and wherein the space is allocated in a shared register file.

23. The system of claim 18, wherein the mapping maps all processing contexts belonging to a same pipeline slice together on a same processing block.

24. The system of claim 18, wherein the processing further includes:

setting a program state for execution.

25. The system of claim 24, wherein the program state includes at least one of a memory buffer status, queue status, a pipeline stage identifier, or pipeline stage status.

26. The system of claim 25, wherein the queue status is a register file queue status.

27. The system of claim 26, wherein the register file queue status includes one of more of empty, full, or current number of elements stored.

28. The system of claim 25, wherein the pipeline stage status is a number of instructions executed.

29. The system of claim 18, wherein executing the one or more processing contexts on the processor core includes:

each processing block of the one or more processing blocks executing the processing context of the one or more processing contexts mapped thereto.

30. The system of claim 29, wherein executing the one or more processing contexts on the processor core is performed based on a prioritization policy.

31. The system of claim 30, wherein the prioritization policy uses a pipeline stage identifier included in a program state to determine a next processing context to execute based on a current stage of the pipeline.

32. The system of claim 30, wherein the prioritization policy uses a queue status included in a program state to determine a next processing context to execute.

33. The system of claim 32, wherein the queue status is a register file queue status.

34. The system of claim 18, wherein the hardware is a graphics processing unit (GPU).

* * * * *